(12) United States Patent
Yamazaki

(10) Patent No.: US 9,842,037 B2
(45) Date of Patent: Dec. 12, 2017

(54) METHOD AND APPARATUS FOR VERIFYING CONFIGURATION

(71) Applicant: FUJITSU LIMITED, Kawasaki-shi, Kanagawa (JP)

(72) Inventor: Masanori Yamazaki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 172 days.

(21) Appl. No.: 14/746,016

(22) Filed: Jun. 22, 2015

(65) Prior Publication Data
US 2016/0048436 A1   Feb. 18, 2016

(30) Foreign Application Priority Data

Aug. 15, 2014   (JP) ................................. 2014-165416

(51) Int. Cl.
| | | |
|---|---|---|
| G06F 9/00 | (2006.01) | |
| G06F 15/177 | (2006.01) | |
| G06F 11/22 | (2006.01) | |
| G06F 11/30 | (2006.01) | |
| G06F 9/44 | (2006.01) | |
| G06F 9/445 | (2006.01) | |
| G06F 9/455 | (2006.01) | |

(52) U.S. Cl.
CPC ........ G06F 11/2289 (2013.01); G06F 9/4401 (2013.01); G06F 9/44505 (2013.01); G06F 9/45533 (2013.01); G06F 11/3051 (2013.01); *Y02B 60/185* (2013.01)

(58) Field of Classification Search
CPC ............... G06F 11/2289; G06F 9/4401; G06F 9/44505; G06F 9/45533; G06F 11/3051; G06F 9/4416; G06F 21/575; G06F 1/3203
USPC ............................................................ 713/2
See application file for complete search history.

(56) References Cited

U.S. PATENT DOCUMENTS

| | | | | |
|---|---|---|---|---|
| 2008/0126778 | A1 | 5/2008 | Bishop et al. | |
| 2013/0198504 | A1* | 8/2013 | Arnold ...................... | G06F 9/44 713/2 |
| 2013/0346737 | A1* | 12/2013 | Yu .......................... | G06F 9/4416 713/2 |
| 2015/0113309 | A1* | 4/2015 | Grieco ................. | G06F 11/3062 713/340 |
| 2015/0301914 | A1* | 10/2015 | Phuong ............... | G06F 11/2284 713/322 |

FOREIGN PATENT DOCUMENTS

| | | | | |
|---|---|---|---|---|
| IL | WO 2015099700 A1 * | 7/2015 | ......... | H02J 13/0006 |
| JP | 2001-325171 | 11/2001 | | |
| JP | 2008-59585 | 3/2008 | | |
| JP | 2013-156993 | 8/2013 | | |

* cited by examiner

*Primary Examiner* — Nitin Patel
(74) *Attorney, Agent, or Firm* — Fujitsu Patent Center

(57) ABSTRACT

A computation unit detects booting of a virtual machine or a physical machine in a system. The computation unit collects configuration parameters from virtual machines or physical machines in the system. The computation unit retrieves information about a constraint on the system from a storage device, in relation to the detected booting of a virtual machine or physical machine. The computation unit determines whether the collected configuration parameters satisfy the retrieved constraint, and it controls whether to continue or discontinue the boot process of the virtual machine or physical machine, depending on the result of the determination.

9 Claims, 23 Drawing Sheets

FIG. 8

| | | PHYSICAL MACHINE MANAGEMENT TABLE | | | 111 |
|---|---|---|---|---|---|
| RACK ID | SWITCH ID | PHYSICAL MACHINE ID | LOGICAL SERVER ID | LOCAL DAN ID | |
| 1 | 1 | 1 | 3 | 1 | |
| 1 | 1 | 2 | 2 | 1 | |
| 1 | 2 | 3 | - | 1 | |
| 1 | 2 | 4 | 1 | 2 | |
| 1 | 2 | 5 | 1 | 2 | |
| ... | ... | ... | ... | ... | |
| 2 | 3 | 9 | 8 | 4 | |
| ... | ... | ... | ... | ... | |

FIG. 9

| DISK MANAGEMENT TABLE | | | 112 |
|---|---|---|
| DISK ID | LOCAL DAN ID | LOGICAL SERVER ID |
| 1 | 1 | 2 |
| 2 | 1 | 1 |
| 3 | 2 | 5 |
| ... | ... | ... |

FIG. 10

| LOGICAL SERVER MANAGEMENT TABLE | | | | |
|---|---|---|---|---|
| LOGICAL SERVER ID | TENANT ID | LEASE PERIOD | BOOT-TIME CONSUMPTION | NORMAL POWER CONSUMPTION |
| 1 | 2 | 2014-07-01 TO 2014-07-31 | 200 W | 120 W |
| 2 | 1 | 2014-07-10 TO 2014-07-20 | 150 W | 80 W |
| 3 | 1 | 2014-07-15 TO 2014-07-31 | 150 W | 80 W |
| 4 | 2 | 2014-07-12 TO 2014-07-31 | 180 W | 110 W |
| ... | ... | ... | ... | ... |

FIG. 11

| BIOS SETUP HISTORY TABLE | | | 114 |
|---|---|---|---|
| LOGICAL SERVER ID | LATEST BIOS SETUP | PREVIOUS BIOS SETUP | |
| 1 | Turbo mode = enable, ··· | Turbo mode = disable, ··· | |
| 2 | ··· | ··· | |
| ··· | ··· | ··· | |

FIG. 12

| POWER CONDITION MANAGEMENT TABLE | | | 115 |
|---|---|---|---|
| RACK ID | MAXIMUM POWER LIMIT | NORMAL POWER LIMIT | |
| 1 | 4.5 kW | 4 kW | |
| 2 | 4 kW | 4 kW | |

FIG. 13

| | | | 116 |
|---|---|---|---|
| BIOS SETUP MANAGEMENT TABLE | | | |
| TENANT ID | LOGICAL SERVER ID | CONFIGURATION MASK | |
| 2 | 1 | Turbo mode = disable,<br>Energy Performance = energy efficient,<br>... | |
| 1 | 2 | Turbo mode = disable,<br>Energy Performance = energy efficient,<br>... | |
| 1 | 3 | Power Control = on,<br>... | |
| 2 | 4 | Power Control = on,<br>... | |

FIG. 14

| DISK DISTANCE CONSTRAINT TABLE | | | 117 |
|---|---|---|---|
| LOGICAL SERVER ID | SYSTEM DISK DISTANCE | DATA DISK DISTANCE | |
| 1 | 1 | 2 | |
| 2 | 2 | 3 | |
| 3 | 2 | 2 | |
| ... | ... | ... | |

FIG. 15

CONSTRAINT TEST LOGIC DATA 118

| ITEM NO. | TEST ITEM | CRITERIA |
|---|---|---|
| 1 | BIOS SETUP | FULLY CONFORM TO CONFIGURATION MASK |
| 2 | BOOT-TIME POWER CONSUMPTION | FALL WITHIN UPPER LIMIT OF POWER IN THE SAME RACK |
| 3 | RUN-TIME POWER CONSUMPTION | FALL WITHIN UPPER LIMIT OF POWER IN THE SAME RACK |
| 4 | PHYSICAL MACHINE ARRANGEMENT SUITABLE FOR NETWORK ISOLATION | ALL PHYSICAL MACHINES CONNECTED TO SWITCH ARE SERVING THE SAME TENANT |
| 5 | DISTANCE BETWEEN DISK AND PHYSICAL MACHINE | FALL WITHIN AN ALLOWABLE DISTANCE |

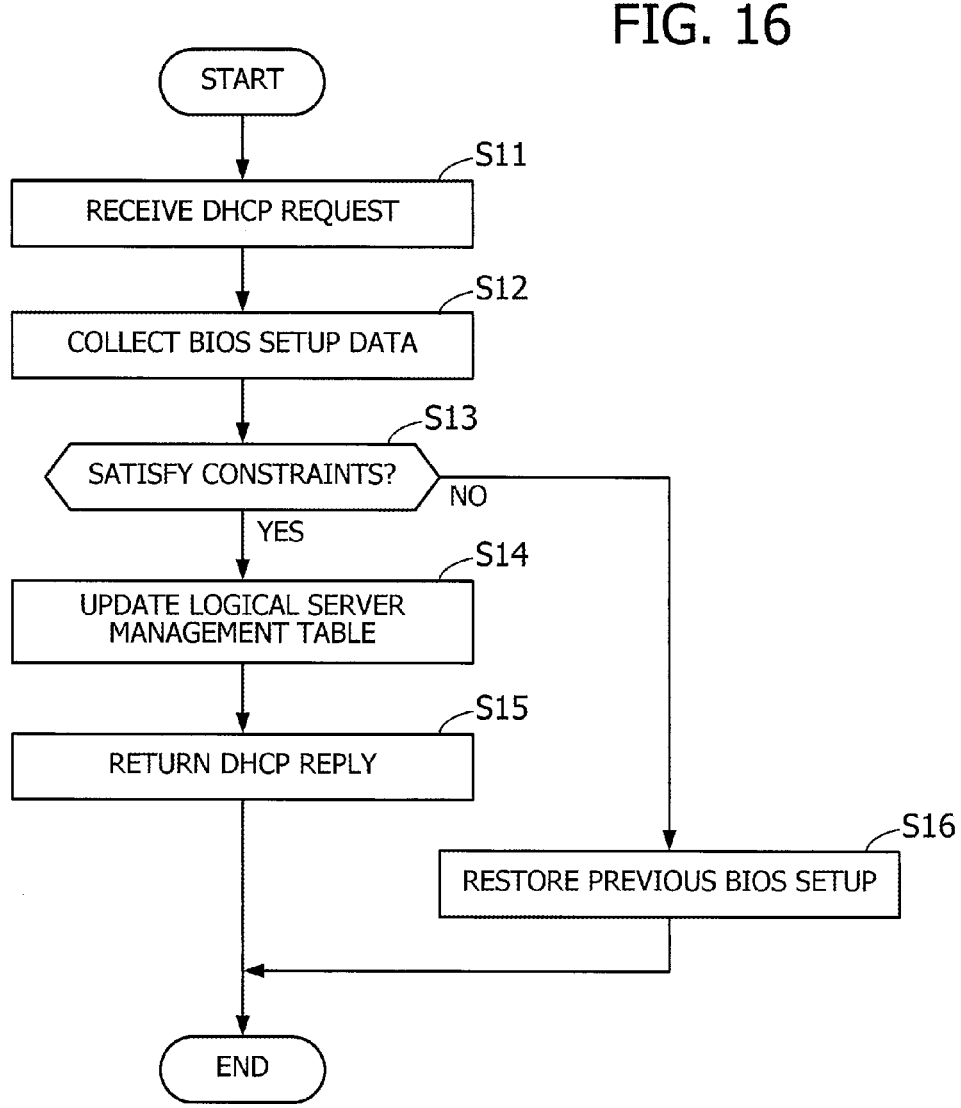

METHOD AND APPARATUS FOR VERIFYING CONFIGURATION

CROSS-REFERENCE TO RELATED APPLICATION

This application is based upon and claims the benefit of priority of the prior Japanese Patent Application No. 2014-165416, filed on Aug. 15, 2014, the entire contents of which are incorporated herein by reference.

FIELD

The embodiments discussed herein relate to a method and apparatus for verifying configuration.

BACKGROUND

Information processing systems made up of a number of network-connected computing devices have been used to provide a user-specific data processing environment to multiple users through a variety of service models. For example, a service provider deploys physical machines in their data center and leases them out to multiple users (also called "tenants"). This service model is sometimes called the "physical Infrastructure as a Service" (physical IaaS). In another service model, a number of virtual machines are configured on physical machines for the purpose of leasing to multiple users.

There has been a need for the capability of reconfiguring a computer from another computer via a network. For example, one proposed computer system employs a management unit to store configuration data for the Basic Input/Output System (BIOS). The configuration data in this management unit is accessible for editing by an external computer system even when the noted computer system is powered off.

Another proposed technique permits a server computer to modify BIOS setup data stored in non-volatile storage devices of a remote personal computer through a local area network (LAN) connection.

Yet another proposed technique is directed to a method of rebooting a multiprocessor data processing system as part of its firmware update procedure. The method performs deallocation of resources, rebooting, and reallocation of resources for each of the multiple processor in an orderly fashion, thereby minimizing the system downtime.

See, for example, the following documents:
Japanese Laid-open Patent Publication No. 2013-156993
Japanese Laid-open Patent Publication No. 2001-325171
Japanese Laid-open Patent Publication No. 2008-59585

As mentioned above, computer systems are expected to provide a capability of flexibly modifying the configuration of physical machines and virtual machines. Think of, for example, a service that leases machines out to users. It would be beneficial for those users if their machine configuration is flexible enough to provide user-specific system environments. However, reconfiguration of one machine or two could lead to a violation of constraints on the system's operation (e.g., a limit of power consumption, requirements for performance and security). When such constraint violation becomes a reality, the behavior of the reconfigured machine may affect operation of other machines in an undesired way.

It is noted here that certain kinds of machine reconfiguration need rebooting of the machine in order to effect its new setup. For example, modification of hardware-related configuration (e.g., BIOS setup and firmware setup) is among the noted kinds of machine reconfiguration. The users are allowed to edit the setup of their respective machines at any time they wish. However, even if the new configuration satisfies system constraints at the time of editing, it does not necessarily mean that the same is true for the next boot of the machine in question.

SUMMARY

In one aspect of the embodiments discussed herein, there is provided a method for verifying configuration. This method includes: detecting, by a computer, booting of a first virtual machine or a first physical machine in a system, the first virtual machine being one of a plurality of virtual machines in the system, the first physical machine being one of a plurality of physical machines in the system; collecting, by the computer, configuration parameters from the virtual machines or the physical machines in the system, including the first virtual machine or first physical machine whose booting has been detected; retrieving, by the computer, information about a constraint on the system from a storage device, the constraint relating to booting of the first virtual machine or first physical machine; determining, by the computer, whether the collected configuration parameters satisfy the retrieved constraint; and controlling, by the computer, whether to continue or discontinue the booting of the first virtual machine or the first physical machine, depending on a result of the determining.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of a physical machine management table used in the second embodiment;

FIG. 9 illustrates an example of a disk management table used in the second embodiment;

FIG. 10 illustrates an example of a logical server management table used in the second embodiment;

FIG. 11 illustrates an example of a BIOS setup history table used in the second embodiment;

FIG. 12 illustrates an example of a power condition management table used in the second embodiment;

FIG. 13 illustrates an example of a BIOS setup management table used in the second embodiment;

FIG. 14 illustrates an example of a disk distance constraint table used in the second embodiment;

FIG. 15 illustrates an example of constraint test logic data used in the second embodiment;

FIG. 16 is a flowchart illustrating an example of how the management apparatus works in the second embodiment;

DESCRIPTION OF EMBODIMENTS

Several embodiments will be described below with reference to the accompanying drawings.

(a) First Embodiment

Figure 1:
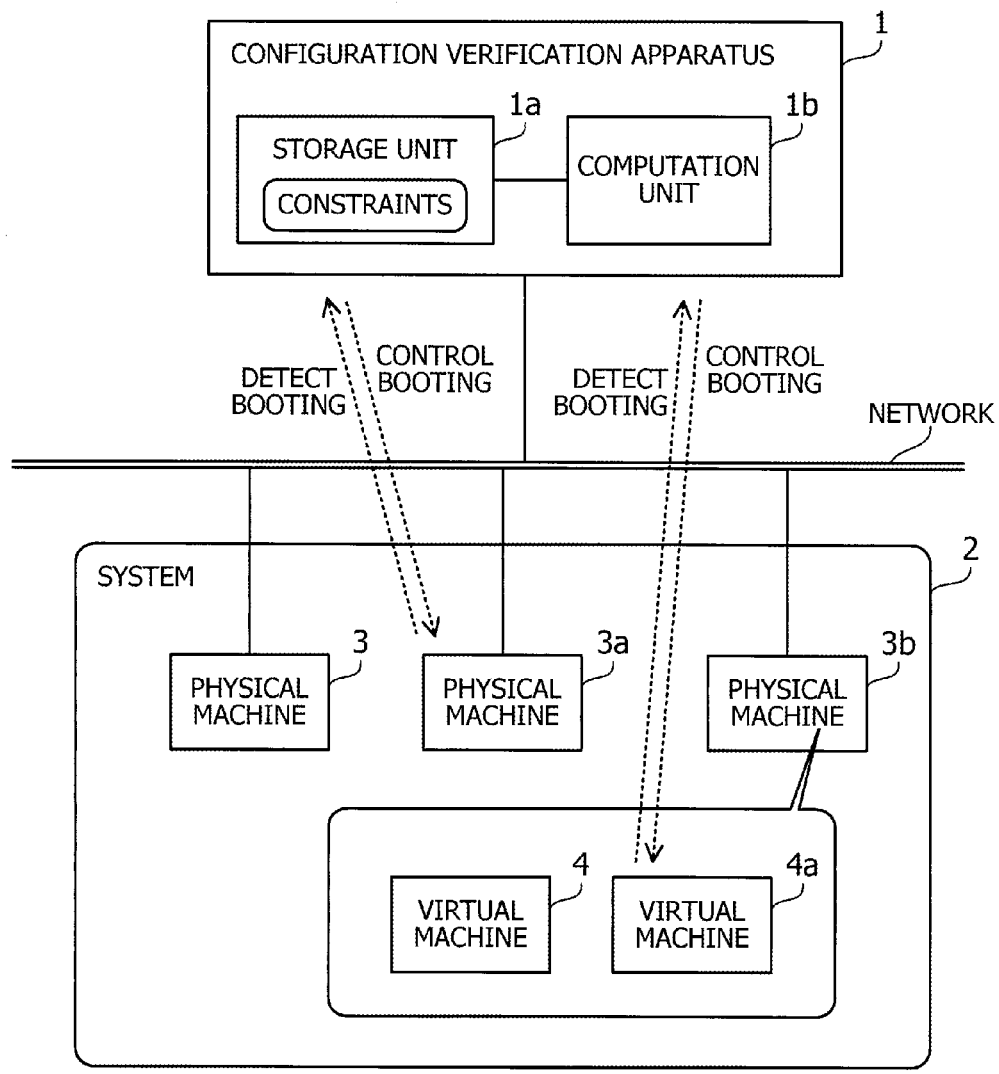
FIG. 1 illustrates a configuration verification apparatus according to a first embodiment.

FIG. 1 illustrates a configuration verification apparatus according to a first embodiment. The illustrated configuration verification apparatus 1 is coupled to a system 2 via a network. The system 2 includes a plurality of physical machines 3, 3a, and 3b, which are physical computers each including a processor (e.g., central processing unit, or CPU) and a storage device (e.g., random access memory, or RAM), although FIG. 1 does not depict them. These physical machines 3, 3a, and 3b have a link to the network, so that the configuration verification apparatus 1 is capable of communicating with them via the network.

The system 2 may include virtual machines 4 and 4a. Virtual machines 4 and 4a are virtual computer systems emulated on one or more physical machines by using their physical resources such as processors and RAM. For example, the rightmost physical machine 3b in FIG. 1 executes a piece of computer software called a "hypervisor." This hypervisor program creates and runs virtual machines 4 and 4a on the physical machine 3b by using physical resources available in the physical machine 3b.

The configuration verification apparatus 1 collects and verifies configuration data of the physical machines 3, 3a, and 3b, as well as of virtual machines 4 and 4a. To this end, the configuration verification apparatus 1 includes a storage unit 1a and a computation unit 1b. The storage unit 1a may be volatile storage devices, such as RAM, or may be non-volatile storage devices, such as hard disk drives (HDD) and flash memory devices. The computation unit 1b may include a CPU, digital signal processor (DSP), application-specific integrated circuit (ASIC), Field-programmable gate array (FPGA), or other processing device, or any combination of them. The computation unit 1b may be implemented as a processor that executes specific programs. The term "processor" refers not only to a single processor, but also to a system of multiple processors.

The storage unit 1a stores information about one or more constraints that the system 2 is supposed to satisfy in relation to the boot process of a virtual machine 4 and 4a or a physical machine 3, 3a, and 3b. These constraints restrict configuration parameters that will be reflected in the operation of a machine when it boots up. For example, the constraints may place some specific limitations on the power consumption, performance, and security of the system 2 as a whole.

More specifically, one class of configuration parameters is about power consumption. For example, the BIOS setup and firmware setup will govern the hardware operation of physical machines. One example of constraints in this area is an upper limit of power consumption of the entire system 2. That is, the system 2 is supposed to manage its power consumption not to exceed the power limit specified as a constraint.

Another class of configuration parameters is about the performance of machines. They are, for example, BIOS setup, firmware setup, and other parameters relating to hardware operation of physical machines. The users may have different hardware setups to satisfy their different needs for machine performance. For example, the number of CPUs and operation mode of CPUs may constitute a constraint in this area.

Yet another class of configuration parameters is about the security of network connections. For example, the information about connections between physical machines and network switches may be used to implement network isolation. While two or more users may share a single network switch, this setup risks the secrecy of communications. Accordingly, the network isolation between physical machines (or virtual machines) of different users may constitute a constraint in this area.

The computation unit 1b detects booting of one of the virtual machines and physical machines in the system 2. The computation unit 1b then collects configuration parameters from virtual machines or physical machines in the system 2, including the virtual machine or physical machine whose booting is detected (which is referred to as the "booting machine," i.e., the machine being in the process of booting).

The computation unit 1b consults the storage unit 1a to retrieve one or more constraints that relate to the booting of the above virtual machine or physical machine in the system 2. The computation unit 1b determines whether the collected configuration parameter satisfy the retrieved constraints. Depending on the result of this determination, the computation unit 1b controls whether to continue or discontinue the current boot process of the booting machine.

Suppose, for example, that one physical machine 3a is to boot up. The computation unit 1b detects this event and thus collects configuration parameters from physical machines 3, 3a, and 3b. The computation unit 1b also consults the storage unit 1a to retrieve information about constraints on the system 2, particularly relating to the booting of the physical machine 3a. The computation unit 1b then determines whether the collected configuration parameter satisfy the retrieved constraints.

For example, the computation unit 1b may determine whether the power consumption of the system 2 is kept within its upper limit. More specifically, the computation unit 1b interacts with the physical machines 3, 3a, and 3b, upon booting of the physical machine 3a, to collect configuration parameters (e.g., BIOS parameters and firmware parameters) for determining power consumption. The collected configuration parameters permit the computation unit 1b to estimate total power consumption of the system 2, taking the booting of the physical machine 3a into consideration. If the total power consumption is within a given upper limit, the computation unit 1b allows the physical machine 3a to continue its boot process. If the total power consumption exceeds the upper limit, the computation unit 1b forces the physical machine 3a to stop its boot process.

The computation unit 1b also controls bootup of virtual machines in a similar way. For example, when a virtual machine 4a boots up on a physical machine 3b, the total power consumption of the system 2 is expected to increase, because the virtual machine 4a uses its assigned resources in the physical machine 3b and thus consumes power in the same. The computation unit 1b determines whether the expected total power consumption exceeds a limit that the system 2 has to observe. More specifically, the computation unit 1b collects configuration parameters from virtual machines 4 and 4a when it detects booting of the latter virtual machine 4a, as well as consulting the storage unit 1a to retrieve constraints on the system 2 in relation to the booting of the virtual machine 4a. For example, the constraints may specify an upper bound of power consumption in each different physical machine. Then the computation unit 1b determines whether the collected configuration parameters conform to these constraints, and it controls whether to continue or discontinue the ongoing boot process for the virtual machine 4a, depending on the determination result.

As another example, the computation unit 1b may also test the configuration about hardware performance (e.g., BIOS setup and firmware setup) of a physical machine 3a in terms of whether the physical machine 3a can provide sufficient performance for its user, as agreed by contract or whatever. More specifically, the computation unit 1b allows the physical machine 3a to continue its boot process when the performance setup of the physical machine 3a meets the user's expectation. The computation unit 1b, on the other hand, causes the physical machine 3a to discontinue its boot process when the performance setup of the physical machine 3a is unsuitable for the user's expectation. The computation unit 1b may do the same control a virtual machine that is to boot. For example, the computation unit 1b may determine whether the performance setup of a virtual machine 4a is suitable for its user's expectation.

As yet another example, the computation unit 1b may test a constraint about network isolation. When it is detected that a certain user's physical machine 3a has started to boot, the computation unit 1b determines whether the physical machine 3a in question is different from other users' physical machines 3 and 3b in terms of to which switch they are connected. When they are connected to different switches, the computation unit 1b allows the physical machine 3a to continue its boot process. When they are connected to the same switch, the computation unit 1b causes the physical machine 3 to discontinue its boot process. The computation unit 1b may do the same test for a virtual machine that is to boot. For example, a security issue arises when two virtual machines 4 and 4a serve different users, because they are connected to a virtual switch running on the same physical machine 3b. This situation may lead to the need for isolated virtual switches.

In operation, the above configuration verification apparatus 1 performs the following process for verifying configuration. The process begins with detection of a virtual machine or physical machine that has started to boot in the system 2. The process then collects configuration parameters collected from virtual machines or physical machines in the system, including the booting machine, and consults the local storage unit 1a to retrieve one or more constraints on the system 2 in relation with the booting of that machine. It is then determined whether the collected configuration parameters satisfy the retrieved constraints. The result of this determination is used to control whether to continue or discontinue the boot process in the booting machine. In this way, the booting of a virtual machine or physical machine triggers verification of the configuration in the light of system constraints. The boot process may or may not be allowed to go on, depending on the conformity between the configuration and constraints.

The system 2 offers physical machines and virtual machines, and their operation can be configured in a flexible manner. Think of, for example, a service that leases those machines to users (tenants). It is beneficial for those users if their machines are configurable enough to provide user-specific system environments. However, reconfiguration of one machine or two could lead to a violation of constraints on the system's operation (e.g., a limit of power consumption, requirements for performance and security). When such constraint violation becomes a reality, the behavior of the reconfigured machine may affect operation of other machines in an undesired way.

Particularly, certain kinds of machine reconfiguration need rebooting of the machine in order to effect its new configuration. For example, modification of hardware-related configuration (e.g., BIOS setup and firmware setup) is among the noted kinds of machine reconfiguration. The users are allowed to edit the setup of their respective machines at any time they wish. However, even if the new configuration satisfies system constraints at the time of editing, it does not necessarily mean that the same is true for the next boot of the machine in question. The actual operation of machines in the system may change dynamically with requests from their users, constraints on the system, and the like. For this reason, violation of a system constraint may come to the surface upon rebooting the reconfigured machine, even if there is no apparent violation at the time of editing of its new configuration.

As an example of such constraint violation, an excessive increase in total power consumption of the system 2 would make it difficult to continue the operation of physical machines 3, 3a, and 3b. Similarly an excessive increase in power consumption of a physical machine 3b would make it difficult to keep the virtual machines 4 and 4a running on that physical machine 3b. As another example, operating a machine with a network configuration that strays outside the bounds of security constraints would spoil the secureness of other machines.

In view of the above, the proposed configuration verification apparatus 1 collects configuration parameters from machines upon booting of one of those machines and determines whether the collected parameters satisfy constraints on the system 2. Then, depending on the result of this determination, the configuration verification apparatus 1 controls whether to continue or discontinue the ongoing boot process in the booting machine. This feature avoids startup of a machine with an inappropriate setup that would otherwise cause the system 2 to violate a constraint.

The above configuration verification apparatus 1 may be modified to cancel a modified configuration of a machine when it is expected to violate a system constraint. Instead of giving up the booting, the machine restores its original configuration and continues the boot process, thus permitting the user to use the machine without interruption.

One of the advantages of physical IaaS model is that the users can set up their hardware environment in a flexible way. In other words, the users pay for the service in expectation of the noted advantage. To fulfill such expectations, the system offers facilities for the users to change their hardware configuration, such as BIOS and firmware setups, as flexibly as possible. However, this flexibility also means a high likelihood of problem that one user's reconfiguration may result in a violation of some constraints on the hardware of the system and thus affect the behavior of another user's physical machine. For example, hardware constraints about power supply and network switch connections are important for the system because they play a fundamental role in ensuring proper operation of physical machines. If some physical machines stop their service as a result of violation of system constraints in a physical IaaS environment, it means that the service provider has failed to fulfill the Service Level Agreement (SLA) with their users.

One thing to consider in this context is that a change in hardware setup of a physical machine will take effect, not immediately, but upon next bootup of the physical machine. For example, the physical machine registers a new configuration before rebooting, such that the machine will effect the new configuration at the next startup. It may be a possible option to test the constraints at the time of changing the current setup. However, a satisfactory test result at the time of registration of a new configuration does not necessarily mean that the constraints will still be satisfied when the physical machine reboots, because some other users may also have reconfigured their machines. In contrast, the proposed configuration verification apparatus 1 is designed to test the constraints when a new configuration actually takes effect in its intended physical machine. This feature of the configuration verification apparatus 1 enables proper determination of whether the new configuration is appropriate or not.

(b) Second Embodiment

Figure 2:
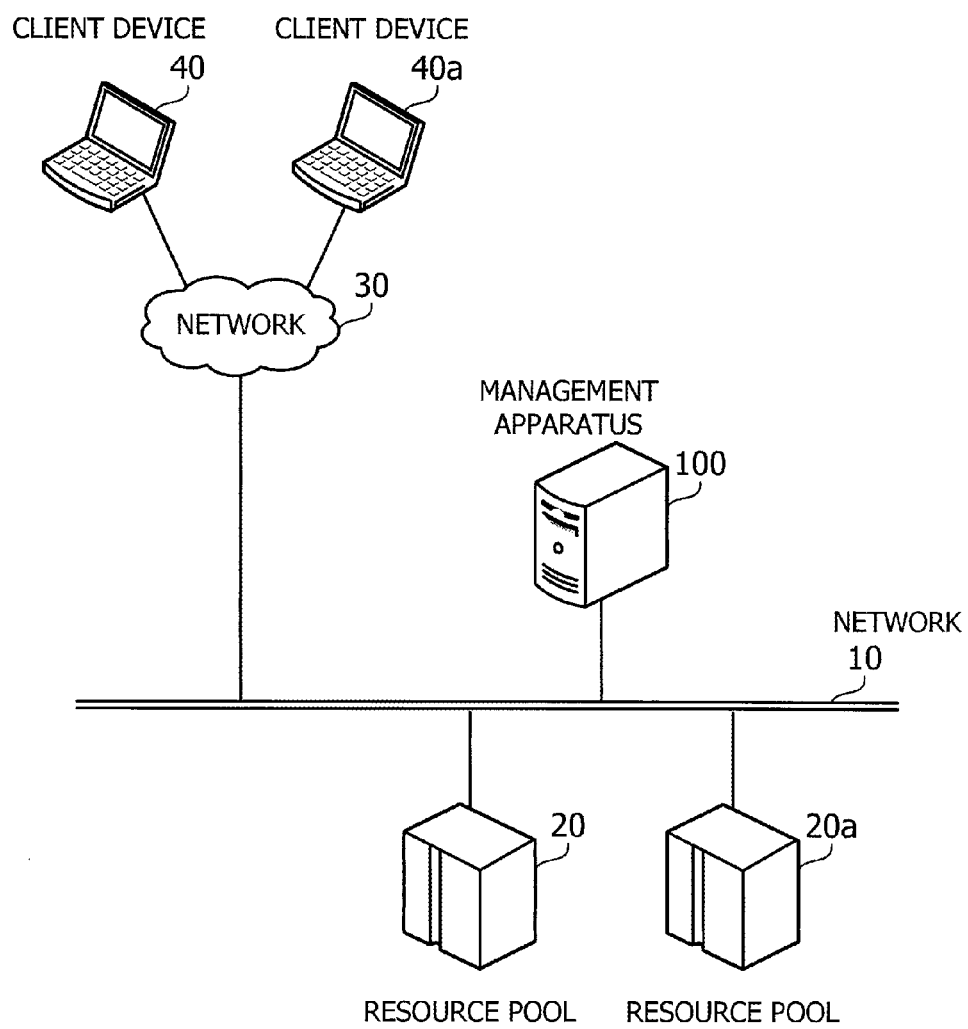
FIG. 2 illustrates an example of an information processing system according to a second embodiment.

FIG. 2 illustrates an example of an information processing system according to a second embodiment. The illustrated information processing system of the second embodiment includes resource pools 20 and 20a, client devices 40 and 40a, and a management apparatus 100. The resource pools 20 and 20a and management apparatus 100 are located in a data center and connected to its network 10. The network 10 is a local area network (LAN) running in the data center premises. Client devices 40 and 40a, on the other hand, are connected to another network 30, which is, for example, a wide area network (WAN) such as the Internet. The former network 10 has a link to the latter network 30.

The resource pools 20 and 20a contain physical resources for lease to the tenants. Available physical resources include CPUs, memories, HDDs, switches, and the like. The resource pools 20 and 20a are ready to provide large quantities of such resources, so that many tenants can use them under the lease agreement.

For example, the resource pools 20 and 20a are realized as two separate racks each capable of accommodating multiple resources. More specifically, one rack, or resource pool 20, accommodates a plurality of CPUs, memory circuits, HDDs, and network switches. Another rack, or resource pool 20a, similarly contains a plurality of CPUs, memory circuits, HDDs, and network switches.

Client devices 40 and 40a are computers that act as clients in the illustrated system for use by different tenants. For example, one tenant manipulates their allocated resources in the resource pools 20 and 20a through a client device 40. Likewise, another tenant manipulates their allocated resources in the resource pools 20 and 20a through another client device 40a. In this way, the service provider leases physical resources in their data center out to multiple tenants. This service is called physical IaaS.

For example, the client devices 40 and 40a may access web pages that the resource pools 20 and 20a or management apparatus 100 provides for the purpose of resource management. The tenants run a web browser application on their respective client devices 40 and 40a to use a graphical user interface (GUI) of the resource management tool on those web pages. For example, a resource request may be issued through a GUI screen. This request designates desired specifications of CPU, capacity of memory, capacity of HDD, and other various parameters of BIOS setup and firmware setup, all of which relate to how the CPU, memory, and HDD will operate. The BIOS may include a software interface defined by the Extensible Firmware Interface (EFI) or Unified Extensible Firmware Interface (UEFI) specifications.

The management apparatus 100 is a server computer configured to manage the usage of resources in the resource pools 20 and 20a. Specifically, the management apparatus 100 stores information about various constraints and monitors the resource usage of each tenant in the light of those constraints. For example, the constrains include those that have be satisfied for proper operation of resources, as well as those relating to the service agreements between the service provider and individual tenants. The management apparatus 100 is an example of the configuration verification apparatus 1 previously discussed in the first embodiment.

Figure 3:
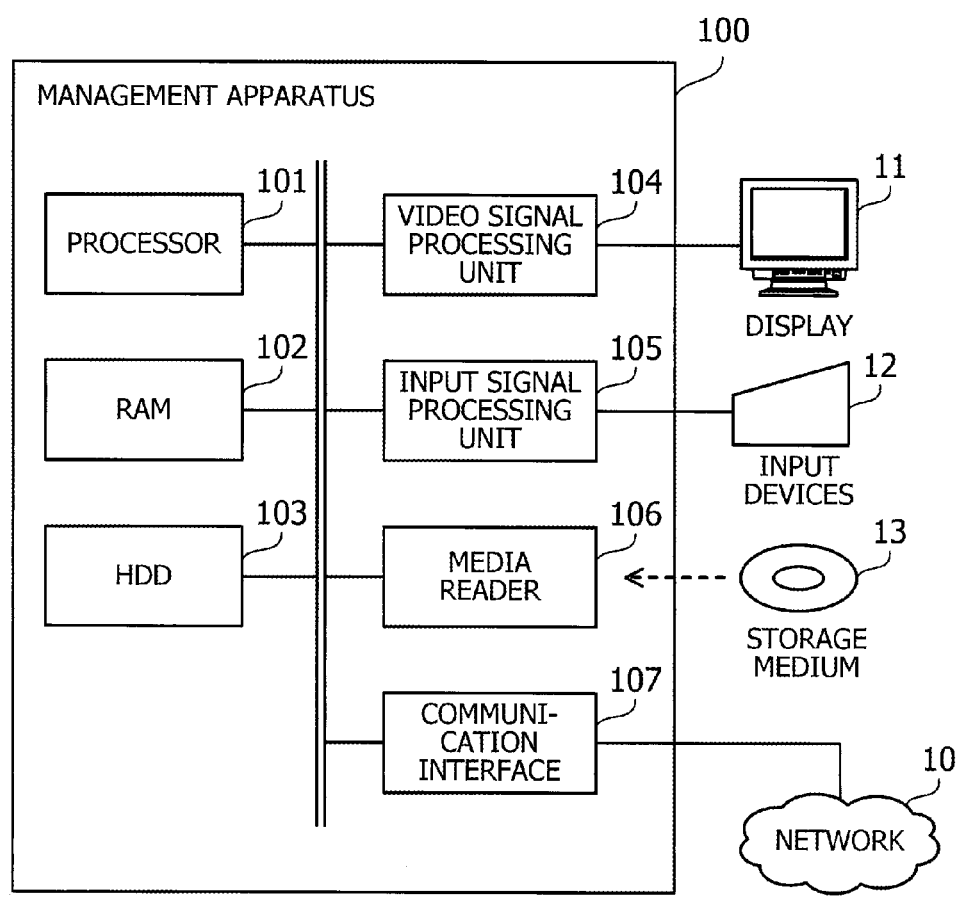
FIG. 3 illustrates an exemplary hardware structure of a management apparatus proposed in the second embodiment.

FIG. 3 illustrates an exemplary hardware structure of a management apparatus proposed in the second embodiment. The illustrated management apparatus 100 includes a processor 101, a RAM 102, an HDD 103, a video signal processing unit 104, an input signal processing unit 105, a media reader 106, and a communication interface 107. These components are connected to an internal bus of the management apparatus 100.

The processor 101 controls data processing operations in the management apparatus 100. The processor 101 may be a single processing device or a multiprocessor system including two or more processing devices. More specifically, the processor 101 may be a CPU, DSP, ASIC, FPGA, or other electronic device, or any combination of them.

The RAM 102 serves as a primary storage device in the management apparatus 100. Specifically, the RAM 102 is used to temporarily store at least some of the operating system (OS) programs and application programs that the processor 101 executes, as well as various data objects that it manipulates at runtime.

The HDD 103 serves as a secondary storage device in the management apparatus 100 to store program and data files of the operating system and applications. The HDD 103 writes and reads data magnetically on its internal platters. The management apparatus 100 may include a plurality of nonvolatile storage devices such as flash memories and solid state drives (SSD) in place of, or together with the HDD 103.

The video signal processing unit 104 produces video images in accordance with commands from the processor 101 and outputs them on a screen of a display 11 coupled to the management apparatus 100. The display 11 may be, for example, a cathode ray tube (CRT) display or a liquid crystal display.

The input signal processing unit 105 receives input signals from input devices 12 and supplies them to the processor 101. The input devices 12 include, for example, a keyboard and a pointing device (e.g., mouse and touchscreen).

The media reader 106 is used to read programs and data stored in storage media 13. The storage media 13 may include, but not be limited to, magnetic disk media such as flexible disk (FD) and HDD, optical disc media such as compact disc (CD) and digital versatile disc (DVD), and magneto-optical storage media such as magneto-optical disc (MO). The storage media 13 also include flash memory cards and other non-volatile semiconductor memory devices. The media reader 106 transfers programs and data read out of a storage medium 13 to, for example, the RAM 102 or HDD 103 according to commands from the processor 101.

The communication interface 107 enables the processor 101 to communicate with other devices on the network 10. The communication interface 107 may be designed for a wired network or a wireless network.

Figure 4:
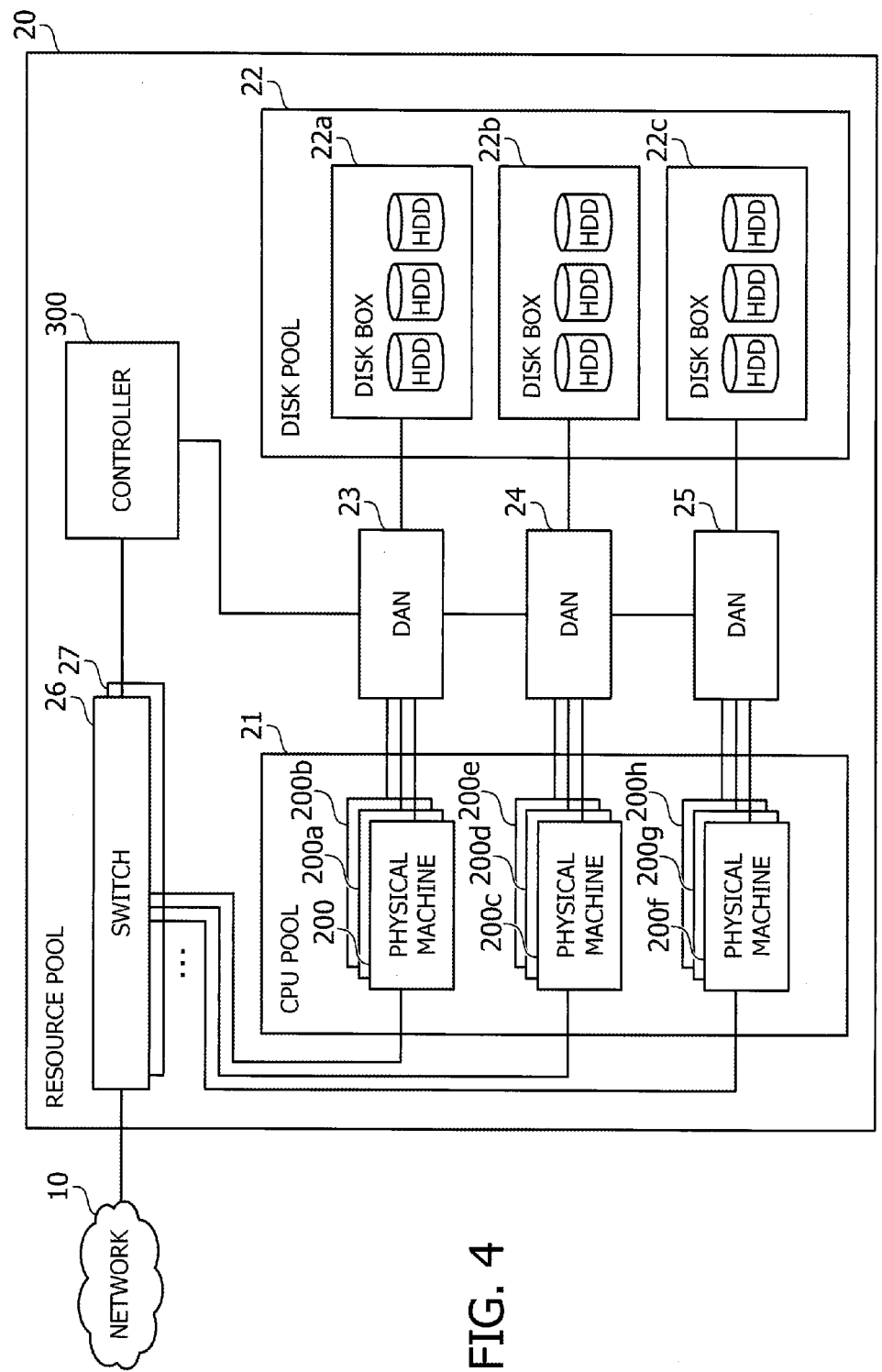
FIG. 4 illustrates an exemplary hardware structure of a resource pool in the second embodiment.

FIG. 4 illustrates an exemplary hardware structure of a resource pool in the second embodiment. The illustrated resource pool 20 includes a CPU pool 21, a disk pool 22, disk area networks (DAN) 23, 24, and 25, switches 26 and 27, and a controller 300. Another resource pool 20a in FIG. 2 is implemented similarly to the resource pool 20 in FIG. 4.

The CPU pool 21 is a collection of CPU and memory resources for lease to the tenants. For example, a CPU is mounted together with memory devices on a single circuit board. This circuit board is referred to as a physical machine, and the CPU pool 21 is a collection of such physical machines. Specifically, the CPU pool 21 in FIG. 4 contains a number of physical machines 200, 200a, 200b, 200c, 200d, 200e, 200f, 200g, and 200h. While not explicit in FIG. 4, these physical machines are actually linked to each other via a bus and thus capable of communicating with each other.

The physical machines may not be uniform in the specifications of CPU, and this is also true for their memory capacity. In other words, the physical machines may have different CPUs and different amounts of memory. This diversity of CPU specifications and memory capacity enables flexible allocation of physical machines depending on the needs of individual tenants.

The disk pool 22 is a set of HDD resources for lease to the tenants. Specifically, the disk pool 22 includes multiple disk boxes 22a, 22b, and 22c, each containing a plurality of HDDs. Those HDDs may be replaced with SSDs or other storage devices. That is, the disk pool 22 may be a set of SSD resources for lease.

The DANs 23, 24, and 25 are communication interfaces that interconnect the CPU pool 21, disk pool 22, and controller 300. More specifically, one DAN 23 connects a group of physical machines 200, 200a, and 200b with a disk box 22a and the controller 300. Another DAN 24 connects another group of physical machines 200c, 200d, and 200e with another disk box 22b. Yet another DAN 25 connects yet another group of physical machines 200f, 200g, and 200h with yet another disk box 22c.

The DANs 23 and 24 are also linked to each other, as are the DANs 24 and 25. It is therefore possible to allocate HDDs from the disk boxes 22a, 22b, and 22c to any physical machine 200, 200a, 200b, 200c, 200d, 200e, 200f, 200g, and 200h via the DANs 23, 24, and 25.

The switches 26 and 27 serve as relaying devices used to connect the resource pool 20 to a network 10. Each physical machine is connected to at least one of these two switches 26 and 27, thus being able to communicate with the management apparatus 100 and client devices 40 and 40a via the network 10. These connections to the switches 26 and 27 also allow the physical machines to communicate with each other. Further, the controller 300 is linked to one switch 26 and thus able to communicate with the management apparatus 100 and client devices 40 and 40a (not depicted in FIG. 4) via the network 10.

The controller 300 is a server computer configured to allocate resources to the tenants. The tenants use different numbers of CPUs and HDDs, depending on their individual needs. The controller 300 considers these requirements when it selects and allocates resources in the resource pool 20 to the tenants. The controller 300 builds and configures a logical server having a desired structure on an on-demand basis by deploying OS and middleware on an appropriate combination of CPU, memory, and HDD and provides it to the requesting user.

Figure 5:
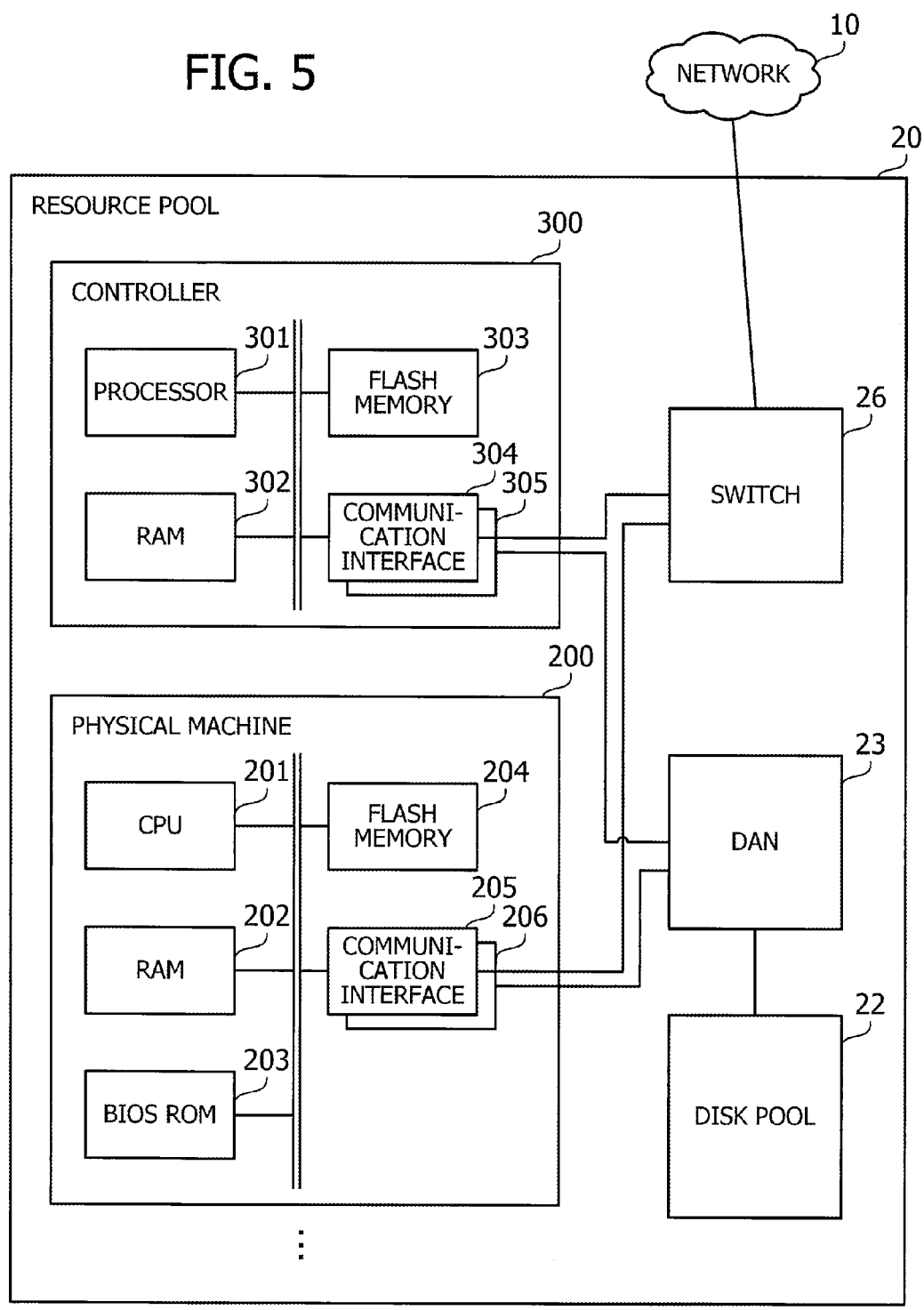
FIG. 5 illustrates an exemplary hardware structure of a physical machine in the second embodiment.

FIG. 5 illustrates an exemplary hardware structure of a physical machine in the second embodiment. The illustrated physical machine 200 is made up of a CPU 201, a RAM 202, a BIOS read-only memory (ROM) 203, a flash memory 204, and communication interfaces 205 and 206. The hardware structure of this physical machine 200 also applies to other physical machines.

The CPU 201 controls data processing operations in the physical machine 200. This CPU 201 is to be leased to tenants as a CPU resource. The RAM 202 serves as a primary storage device in the physical machine 200. Specifically, the RAM 202 is used to temporarily store at least some of the OS programs and application programs that the CPU 201 executes, as well as various data objects that it manipulates at runtime. The RAM 202 is also to be leased to tenants as a memory resource.

The BIOS ROM 203 is a non-volatile storage device containing BIOS programs. The flash memory 204 is a non-volatile storage device for storing BIOS setup data. The communication interfaces 205 and 206 provide the CPU 201 with communication links to the DAN 23 and switch 26. As seen in FIG. 5, one communication interface 205 is connected to the switch 26, while the other communication interface 206 is connected to the DAN 23.

FIG. 5 also depicts an exemplary hardware structure of a controller 300. The illustrated controller 300 includes a processor 301, a RAM 302, a flash memory 303, and communication interfaces 304 and 305. The processor 301 controls data processing operations in the controller 300. The processor 301 may be a single processing device or a multiprocessor system including two or more processing devices. More specifically, the processor 301 may be a CPU, DSP, ASIC, FPGA, or other electronic device, or any combination of them.

The RAM 302 serves as a primary storage device in the controller 300, which temporarily stores at least some of the OS programs and application programs that the processor 301 executes, as well as various data objects that it manipulates at runtime. The flash memory 303 serves as a secondary storage device of the controller 300, which stores various data objects that the processor 301 manipulates at runtime. The communication interfaces 304 and 305 provide the processor 301 with communication links to the DAN 23 and switch 26. Specifically, one communication interface 304 is connected to the switch 26, while the other communication interface 305 is connected to the DAN 23.

Figure 6:
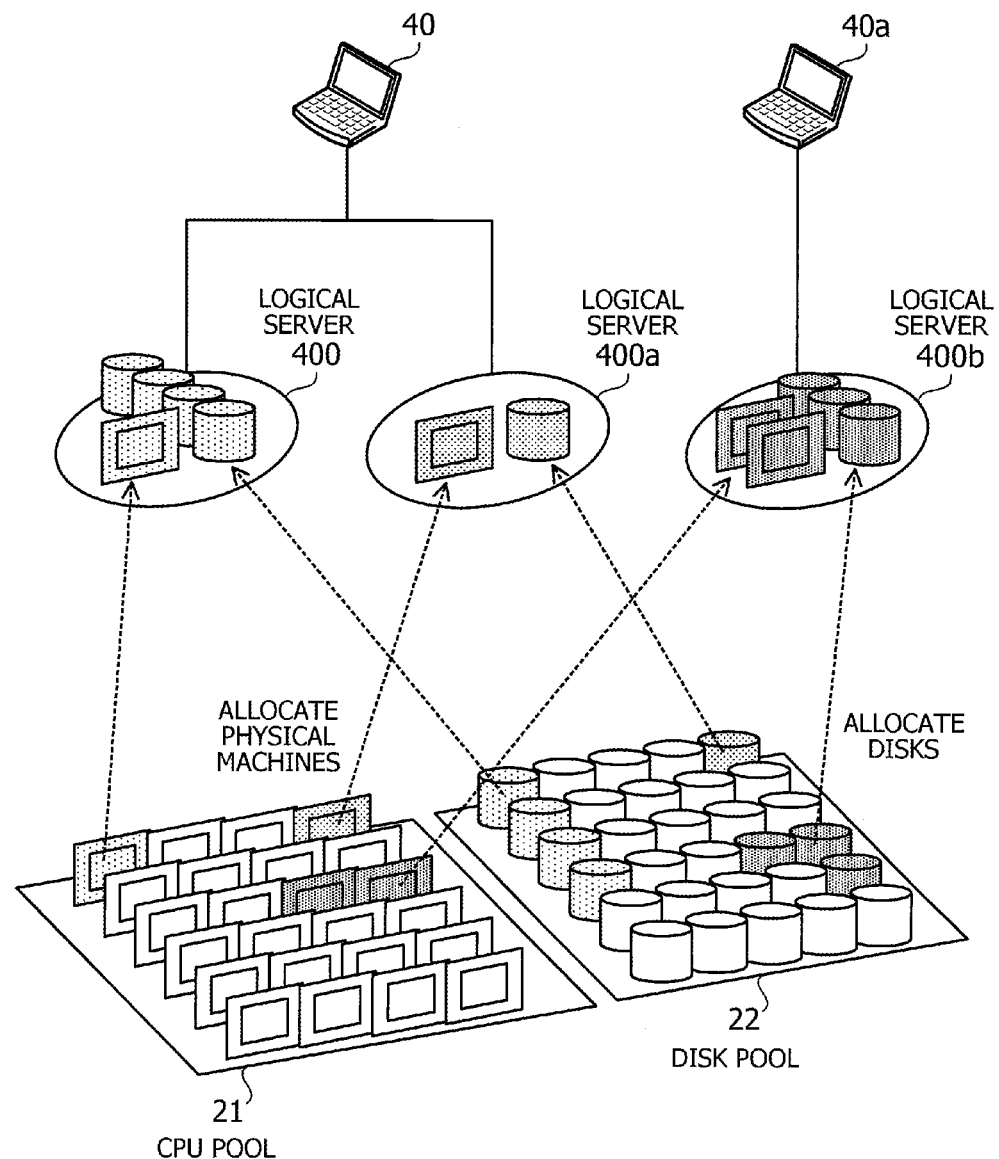
FIG. 6 illustrates an example of logical servers provided in the second embodiment.

FIG. 6 illustrates an example of logical servers provided in the second embodiment. The foregoing controller 300 produces logical servers by combining appropriate resources extracted from the illustrated CPU pool 21 and disk pool 22. For example, the controller 300 extracts one physical machine out of the CPU pool 21, as well as four HDDs out of the disk pool 22, in response to a first request received from one client device 40. The controller 300 combines these resources, thereby producing a logical server 400. The controller 300 then assigns this logical server 400 to the user (first tenant) of the client device 40.

Similarly, the controller 300 extracts another physical machine out of the CPU pool 21, as well as one HDD out of the disk pool 22, in response to a second request received from the same client device 40. The controller 300 produces another logical server 400a by combining these resources and assigns this logical server 400a to the first tenant, who uses the client device 40.

The controller 300 further extracts two physical machines out of the CPU pool 21, as well as three HDDs out of the disk pool 22, in response to a third request received from another client device 40a. The controller 300 produces yet another logical server 400b by combining these resources and assigns this logical server 400b to the user (second tenant) of the client device 40a.

The first tenant is now allowed to install and use their desired OS and applications in the first two logical servers 400 and 400a. Similarly the second tenant is allowed to install and use their desired OS and applications in the third logical server 400b.

Figure 7:
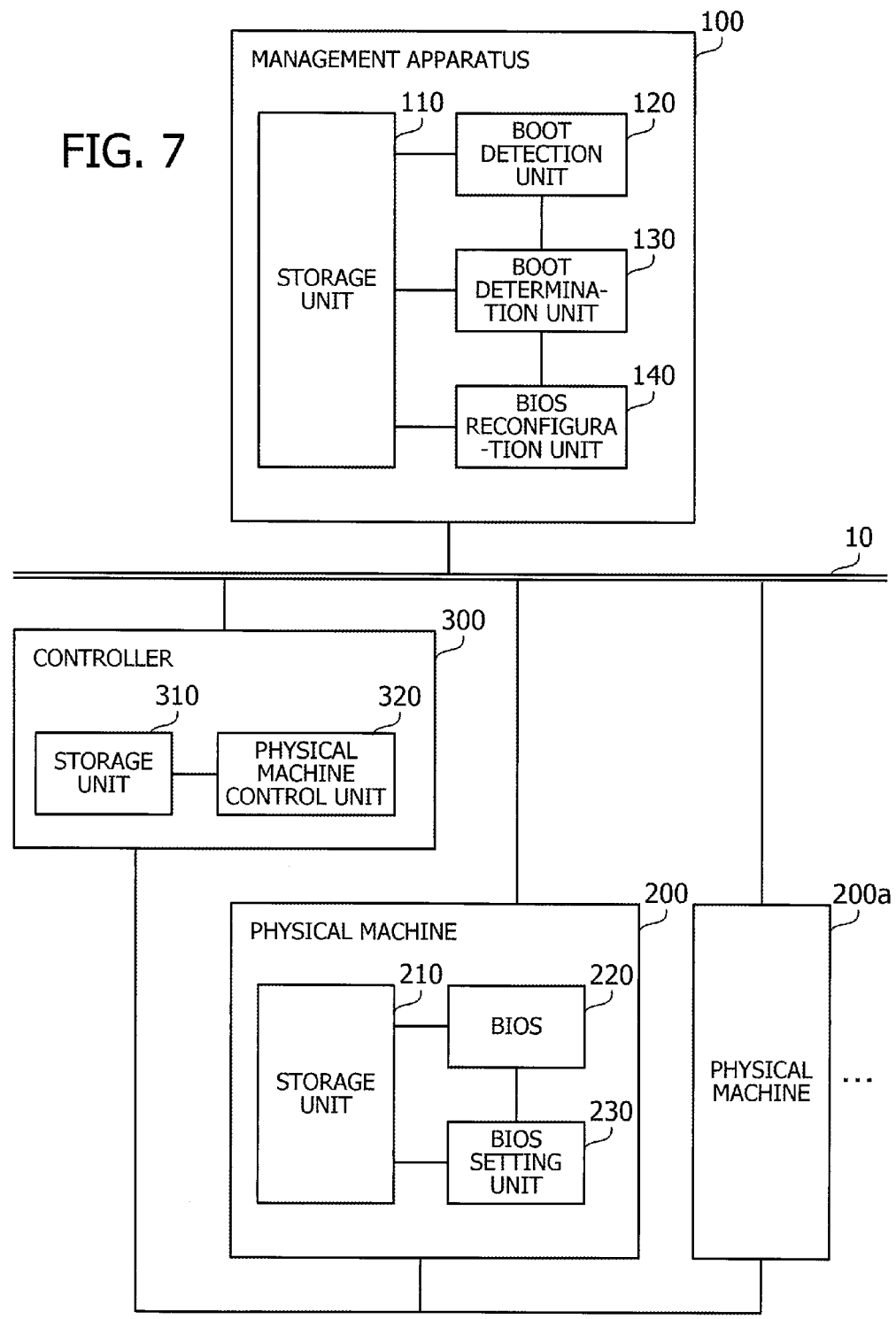
FIG. 7 illustrates an example of functions that the second embodiment provides.

FIG. 7 illustrates an example of functions that the second embodiment provides. The functional blocks seen in FIG. 7 may be realized by causing processors (including CPUs) in the management apparatus 100, physical machine 200, and controller 300 to execute programs in which those functions are encoded.

Specifically, the management apparatus 100 includes a storage unit 110, a boot detection unit 120, a boot determination unit 130, and a BIOS reconfiguration unit 140. The storage unit 110 may be implemented as a storage space reserved in the RAM 102 or HDD 103 or both. This storage unit 110 stores data for management of physical machines and logical servers, as well as some constraints about booting of physical machines.

The boot detection unit 120 detects booting of a physical machine and retrieves information about that machine from the storage unit 110. This information indicates, for example, what logical servers and tenants are associated with the physical machine in question. The retrieved information goes to the boot determination unit 130. Here the management apparatus 100 also acts as a dynamic host configuration protocol (DHCP) server, while the physical machine functions as a DHCP client. That is, the physical machine sends a DHCP request to the DHCP server (management apparatus 100) some time after the bootup of the machine. The boot detection unit 120 receives this DHCP request, which contains a source identifier indicating the sender. That is, the reception of a DHCP request signifies that the sending physical machine is in the process of booting.

The boot detection unit 120 informs the boot determination unit 130 of the physical machine that is booting. The boot determination unit 130 then communicates with this booting physical machine to collect its configuration parameters of BIOS and logical servers. The boot determination unit 130 also consults the storage unit 110 to retrieve data about other physical machines, as well as information about constraints that are supposed to be fulfilled. Based on the retrieved machine data and constraint information, the boot determination unit 130 determines whether the constraints are still satisfied when the noted physical machine is fully booted.

If it is determined that the constraints are satisfied, the boot determination unit 130 permits the physical machine to continue its boot process. If not, the boot determination unit 130 causes the physical machine to discard the current configuration and redo the boot-up process with a previous configuration.

The tenants configure the BIOS of their physical machines, as well as their logical servers. The BIOS reconfiguration unit 140 receives configuration data from the client devices 40 and 40a and stores it in the storage unit 110. When the boot determination unit 130 determines that a physical machine has to restore its previous configuration, the BIOS reconfiguration unit 140 sends a previous version of configuration data to that physical machine.

The illustrated physical machine 200 includes a storage unit 210, a BIOS 220, and a BIOS setting unit 230. These functional blocks also exist in another physical machine 200a in FIG. 7 and other physical machines alike. The storage unit 210 may be implemented as a storage space reserved in the RAM 202 or flash memory 204 or both and configured to store data of BIOS setup. Preferably, the BIOS setup data is saved at least in the flash memory 204.

As previously discussed in FIG. 5, the physical machine 200 has BIOS programs in its BIOS ROM 203. The BIOS 220 in FIG. 7 is realized by executing these BIOS programs with the CPU 201 when the physical machine 200 boots up. What the BIOS 220 actually do in the boot process is, for example, a power-on self-test (POST) of various electronic devices used in the physical machine 200 and selection of an appropriate boot device. Upon boot-up, the BIOS 220 reads BIOS setup data out of the storage unit 210 and configures the devices accordingly.

The BIOS setting unit 230 changes BIOS setup data in the storage unit 210 according to commands from the management apparatus 100 or controller 300. This BIOS setting unit 230 may be implemented as a function of a processor other than the CPU 201. For example, the physical machine 200 may have another processor for management purposes, with which the BIOS setup can be edited even when the CPU 201 is not powered.

FIG. 7 also illustrates a controller 300 including a storage unit 310 and a physical machine control unit 320. The storage unit 310 may be implemented as a storage space reserved in the RAM 302 or flash memory 303 or both. This storage unit 310 stores requirements received from client devices 40 and 40a as to their logical servers. For example, they designate CPU specifications, memory capacity, HDD storage capacity, and BIOS setup.

The physical machine control unit 320 builds a logical server, when so requested by the management apparatus 100, using resources in the CPU pool 21 and disk pool 22. More specifically, the physical machine control unit 320 communicates with the management apparatus 100 to obtain information about the server specifications, OS, middleware, and other things that the requesting tenant desires for their logical server. The physical machine control unit 320 selects a suitable physical machine(s) and HDDs, and forms them into a logical server. As an alternative, the physical machine control unit 320 may build a logical server according to a resource request received directly from client devices 40 and 40a, without the intervention of the management apparatus 100.

FIG. 8 illustrates an example of a physical machine management table used in the second embodiment. This physical machine management table 111 resides in the storage unit 110 of the management apparatus 100. Specifically, each record of the illustrated physical machine management table 111 is formed from the following data fields: Rack Identifier (ID), Switch ID, Physical Machine ID, Logical Server ID, and Local DAN ID.

Rack ID field contains an identifier that indicates a particular resource pool. As discussed previously, resource pools are mounted in separate racks, which means that each resource pool is identified by its unique rack ID. Switch ID filed contains an identifier that indicates a particular network switch. Physical machine ID filed contains an identifier that indicates a particular physical machine. Each physical machine is mounted in a rack, with a fixed connection with a switch. In other words, each mounted physical machine is previously associated with a specific rack ID and a specific switch ID.

Logical server ID field contains an identifier that indicates a particular logical server running on the physical machine. When the physical machine has no assigned logical server, its corresponding logical server ID field indicates so by using a hyphen ("-"). Lastly, Local DAN ID field contains a DAN ID to indicate to which DAN the physical machine is directly connected. This direct DAN connection permits the physical machine to access HDDs in the disk box opposite to the DAN. The physical machine is also allowed to make indirect access to HDDs in other disk boxes via a plurality of DANs.

Referring to the example in FIGS. 2 and 4, one resource pool 20 is identified by its rack ID of "1," and another resource pool 20a is identified by its rack ID of "2." One switch 26 in the former resource pool 20 has a switch ID of "1," and another switch 27 in the same has a switch ID of "2." The latter resource pool 20a similarly contains two switches (not illustrated), and they are distinguished by different switch IDs "3," and "4."

One physical machine 200 in the CPU pool 21 (FIG. 4) has a physical machine ID of "1," and another physical machine 200a has a physical machine ID of "2." Yet another physical machine 200b has a physical machine ID of "3." The CPU pool 21 has more physical machines 200c, 200d, and 200e, which are identified by their respective physical machine IDs "4," "5," and "6." Similarly, another three physical machines 200f, 200g, and 200h are identified by their respective physical machine IDs "7," "8," and "9."

One DAN 23 in the resource pool 20 (FIG. 4) has a DAN ID of "1," and another DAN 24 in the same has a DAN ID of "2." Yet another DAN 25 has its own DAN ID of "3." While not depicted in FIG. 2, another resource pool 20a similarly contains three DANs, which are distinguished by different DAN IDs "4," "5," and "6."

One logical server 400 (FIG. 6) has a logical server ID of "3," and another logical server 400a has a logical server ID of "2." Yet another logical server 400b has a logical server ID of "1."

For example, the physical machine management table 111 in FIG. 8 has a record containing the values of: "1" in Rack ID field, "1" in Switch ID field, in Physical Machine ID field, "3" in Logical Server ID field, and "1" in Local DAN ID field. This record describes the physical machine 200 in the resource pool 20 as being connected to a switch 26 and DAN 23 and used as a resource for a logical server 400.

Another record in the physical machine management table 111 is formed from the values of: "1" in Rack ID field, "2" in Switch ID field, "3" in Physical Machine ID field, "-" (no associated servers) in Logical Server ID field, and "1" in Local DAN ID field. This record describes another physical machine 200b in the same resource pool 20 as being connected to a switch 27 and DAN 23, but not used in any logical server.

FIG. 9 illustrates an example of a disk management table used in the second embodiment. This disk management table 112 resides in the storage unit 110 of the management apparatus 100. Specifically, each record of the illustrated disk management table 112 is formed from the following data fields: Disk ID, Local DAN ID, and Logical Server ID.

Disk ID field contains the identifier of an HDD. Local DAN ID field contains a DAN ID corresponding to the disk box that accommodates that HDD, and Logical Server ID field contains a logical server ID indicating which logical server uses the HDD.

For example, the disk management table 112 in FIG. 9 has a record containing the values of: "1" in Disk ID field, "1" in Local DAN ID field, and "2" in Logical Server ID field. This record represents the presence of an HDD with a disk ID of "1" in the disk box 22a. The record also indicates the HDD as having been allocated to a logical server 400a as its disk resource. It is noted here that the storage unit 110 also stores information about interconnections across the DANs.

FIG. 10 illustrates an example of a logical server management table used in the second embodiment. This logical server management table 113 resides in the storage unit 110 of the management apparatus 100. Specifically, each record of the illustrated logical server management table 113 is formed from the following data fields: Logical Server ID, Tenant ID, Lease Period, Boot-Time Power Consumption, and Normal Power Consumption.

Logical Server ID field contains the identifier of a logical server, and Tenant ID field contains the identifier of a tenant to which that particular logical server is assigned. Lease Period field indicates a range of dates during which the logical server is leased out to the tenant. The boot-time power consumption field indicates the amount of power that the logical server consumes when it starts up. The normal power consumption field indicates the amount of power that the logical server consumes under the normal operating conditions after bootup.

A plurality of physical machines may be used to deploy a logical server. In this case, the boot-time power consumption field and normal power consumption field represent an average power consumption of those physical machines assigned to the logical server. Alternatively, the boot-time power consumption field and normal power consumption field may represent power consumption of the logical server as a whole. In the latter case, the power consumption per physical machine may be evaluated by weighting registered power consumption of each participating physical machine depending on how much part of it is dedicated to the logical server.

For example, the logical server management table 113 contains a record formed from the values of: "1" in Logical Server ID field, "2" in Tenant ID field, "2014/07/01-2014/07/31" in Lease Period field, "200 W" in Boot-time Power Consumption field, and "120 W" in Normal Power Consumption field. This record means that a logical server 400b serves a tenant identified by its tenant ID "2" (or the user of client device 40a) during a lease period from Jul. 1, 2014 to Jul. 31, 2014. The record further indicates that the logical server 400b consumes 200 watts (W) of power when it boots up, and 120 W when it is running normally.

When there is a deployment request for a new logical server from client devices 40 and 40a, the management apparatus 100 adds a new record describing the logical server to the logical server management table 113. The deployment request includes CPU specifications, memory capacity, HDD capacity, lease period, and BIOS setup of a physical machine(s) to be assigned to the requested logical server. The management apparatus 100 then transmits this deployment request to a controller of resource pools (e.g., controller 300), so that the controller selects a physical machine(s) suitable for the desired specifications and builds a logical server on the selected machine(s).

The above-noted new record in the logical server management table 113 may not be fully defined at the time of initial registration. Specifically, the boot-time power consumption field and normal power consumption field may be left blank for the time being, whereas at least the logical server ID, tenant ID, and lease period fields have to be populated. It would be possible, however, for the management apparatus 100 to estimate boot-time power consumption and normal power consumption from the machine specifications, the number of HDDs, BIOS setup, and other requested items. The logical server management table 113 is then populated with those estimated values.

FIG. 11 illustrates an example of a BIOS setup history table used in the second embodiment. This BIOS setup history table 114 resides in the storage unit 110 of the management apparatus 100. Specifically, each record in the illustrated BIOS setup history table 114 is formed from the following data fields: Logical Server ID, Latest BIOS Setup, and Previous BIOS Setup.

Logical Server ID field contains the identifier of a logical server. Latest BIOS Setup field contains the latest set of BIOS parameters for that logical server. Previous BIOS Setup field also contains BIOS parameters, but of the previous generation.

For example, the BIOS setup history table 114 seen in FIG. 11 includes a record containing the values of: "1" in Logical Server ID field, "Turbo mode=enable, . . . " in Latest BIOS Setup field, and "Turbo mode=disable, . . . " in Previous BIOS Setup field. This record means that the logical server 400b was previously configured to disable its Turbo mode, but it has been reconfigured to enable the Turbo mode.

Here the "Turbo mode" is one of the parameters for CPU operation in a physical machine, which activates the function of automatically boosting the operating clock frequency of the CPU. This parameter is set to "enable" to activate the function or to "disable" to deactivate the function. While the BIOS setup history table 114 in FIG. 11 only includes "Turbo mode" for illustrative purposes, logical servers are actually set up with many other BIOS parameters.

FIG. 12 illustrates an example of a power condition management table used in the second embodiment. This power condition management table 115 resides in the storage unit 110 of the management apparatus 100. Each record in the power condition management table 115 is formed from the following data fields: Rack ID, Maximum Power Limit, and Normal Power Limit.

Rack ID field contains an identifier that indicates a resource pool. Maximum Power Limit field gives a maximum limit of electrical power that the resource pool as a whole is allowed to consume. Normal Power Limit field gives an upper limit of electrical power that the resource pool as a whole is allowed to consume in its normal operation.

For example, the illustrated power condition management table 115 has a record containing the values of: "1" in Rack ID field, "4.5 kW" in Maximum Power Limit field, and "4 kW" in Normal Power Limit field. This record means that the power consumption of the resource pool 20 is limited to a maximum of 4.5 kilowatts and 4 kilowatts during normal operation. These upper limit values may previously be determined from, for example, the amount of available electrical power in the data center.

FIG. 13 illustrates an example of a BIOS setup management table used in the second embodiment. This BIOS setup management table 116 resides in the storage unit 110 of the management apparatus 100. Specifically, each record in the BIOS setup management table 116 is formed from the following data fields: Tenant ID, Logical Server ID, and Configuration Mask.

Tenant ID field contains the identifier of a tenant. Logical Server ID field contains the identifier of a logical server. Configuration Mask field gives allowable values of each BIOS setup parameter, except for BIOS setup parameters having no particular limitations.

For example, the illustrated BIOS setup management table 116 has a record containing the values of: "2" in Tenant ID field, "1" in Logical Server ID field, and "Turbo mode=disable, Energy Performance=energy efficient, . . . " in Configuration Mask field. This record means that the logical server 400b is supposed to have a value of "disable" in its "Turbo mode" BIOS parameter, as well as a value of "energy efficient" (power-saving mode) in its "Energy Performance" BIOS parameter for power setup. The content of configuration masks in the BIOS setup management table 116 is defined previously in accordance with, for example, the service agreement between the tenant and the service provider.

FIG. 14 illustrates an example of a disk distance constraint table used in the second embodiment. This disk distance constraint table 117 resides in the storage unit 110 of the management apparatus 100. Specifically, each record in the disk distance constraint table 117 is formed from the following data fields: Logical Server ID, System Disk Distance, and Data Disk Distance.

Logical Server ID field contains the identifier of a logical server. This logical server runs on a physical machine, and its operating system is stored in an HDD that is designated as a system disk. The logical server also uses a data disk (HDD) to store user data and the like. In the disk distance constraint table 117, System Disk Distance field indicates an allowable distance between the physical machine and the system disk. Data Disk Distance field similarly indicates an allowable distance between the physical machine and the data disk.

When a number of HDDs are available as disk resources, the management apparatus 100 may select one or more of those HDDs for use with a particular physical machine, based on their physical distances from the machine. The physical distance in this context is evaluated in terms of the number of intervening interfaces (e.g., intervening DANs) between the physical machine and each candidate HDD. The closer the HDD is to the physical machine, the smaller the communication overhead will be. For better performance, it is meaningful to place a constraint that gives an upper limit to the distance.

Referring back to FIG. 4, the HDDs in one disk box 22a are at a distance of one from physical machines 200, 200a, and 200b since their connection path includes only one intervening DAN (DAN 23). On the other hand, the HDDs in another disk box 22b are at a distance of two from those physical machines 200, 200a, and 200b since their connection path includes two intervening DANs (DANs 23 and 24). The HDDs in yet another disk box 22c are at a distance of three from the same physical machines 200, 200a, and 200b since their connection path includes three intervening DANs (DANs 23, 24, and 25). The foregoing physical machine management table 111 and disk management table 112 permit the management apparatus 100 to calculate such disk distances representing how far the HDDs are from physical machines.

The disk distance constraint table 117 seen in FIG. 14 includes a record containing the values of "1" in Logical Server ID field, "1" in System Disk Distance field, and "2" in Data Disk Distance field. This record gives the logical server 400b a specific constraint about the location of HDDs that serve as its system disk and data disk. That is, the system disk has to be within a distance of one (inclusive) from the physical machine allocated for the logical server 400b. The data disk has to be within a distance of two (inclusive) from the same. The values of system disk distance and data disk distance in the disk distance constraint table 117 are defined previously in accordance with, for example, the service agreement between the tenant and the service provider.

FIG. 15 illustrates an example of constraint test logic data used in the second embodiment. This constraint test logic data 118 resides in the storage unit 110 of the management apparatus 100. Specifically, each item in the constraint test logic data is formed from the following data fields: Item Number, Test Item, and Criteria.

Item Number field contains numerals or other form of information that identifies a particular constraint test logic that is registered. Test Item field indicates what kind of constraint is to be tested, and Criteria field describes how to determine the conformity to that constraint.

For example, the constraint test logic data 118 seen in FIG. 15 provides five constraints and their test logics as follows:

The first test logic in Item No. 1 evaluates the BIOS setup in terms of whether the BIOS setup fully conforms to the foregoing configuration mask. Specifically, the boot determination unit 130 achieves this test by comparing each item of BIOS setup of the booting physical machine with a relevant configuration mask defined in the BIOS setup management table 116. That is, the configuration mask specifies the values of some configuration parameters, and the constraint demands that the BIOS setup gives the same values as specified in the configuration mask. If some part of the BIOS setup differs from the configuration mask, it means that the BIOS setup fails to satisfy the constraint. Stated in reverse, the constraint is satisfied if the BIOS setup has no items outside the bounds of the configuration mask.

The second test logic in Item No. 2 evaluates the boot-time power consumption of physical machines in a rack in terms of whether it falls within a power limit of the rack. The phrase "physical machines in a rack" refers to a group of physical machines that belong to the same resource pool (this also applies to the third test logic described later). More specifically, the boot determination unit 130 calculates boot-time power consumption of the booting physical machine from the values of its BIOS setup items. When two or more physical machines are to boot (i.e., when a plurality of physical machines are assigned to a logical server), the boot determination unit 130 calculates boot-time power consumption of each of those physical machines in a similar way.

The storage unit 110 stores predefined information about power consumption at the time of booting physical machines. This information gives, for example, a reference power consumption of physical machines, as well as increments of power consumption relative to the reference power consumption, corresponding to individual BIOS setup items. The boot determination unit 130 uses this information, together with BIOS setup data collected from the booting physical machine, to calculate boot-time power consumption of the booting physical machine. The boot determination unit 130 similarly calculates boot-time power consumption of other physical machines that belong to the same resource pool as the booting physical machine. The boot determination unit 130 compares the total power consumption of the booting physical machine and the other physical machines in the same resource pool with the registered value of maximum power limit in the power condition management table 115, thus achieving the test of Item No. 2.

More specifically, the boot determination unit 130 checks whether the physical machines keep their power limit during a lease period of the booting physical machine. Referring to the exemplary logical server management table 113 in FIG. 10, suppose now that the controller 300 is to boot a physical machine 200 to provide a logical server 400 (logical server ID "3") for a tenant in a lease period of Jul. 15, 2014 to Jul. 31, 2014. Assuming that the present date is Jul. 20, 2014, the boot determination unit 130 scans the logical server management table 113 to extract logical servers that may be booted from the resource pool 20 during a time window of Jul. 20, 2014 to Jul. 31, 2014. Some of these logical servers have overlapping lease periods during the time window. The boot determination unit 130 then adds up the boot-time power consumption of physical machines assigned to such logical servers with overlapping lease periods. The total power consumption varies from day to day and may exceed the predetermined maximum power limit. The boot determination unit 130 now determines whether there is a moment of such excessive power consumption in the above time window. If no such moment is found, the boot determination unit 130 concludes that the constraint in question is satisfied. If there is a moment of excessive power consumption, the boot determination unit 130 concludes that the constraint in question is not satisfied.

The third test logic in Item No. 3 evaluates the run-time power consumption of physical machines in a rack in terms of whether it falls within a normal power limit of the rack. The boot determination unit 130 calculates normal power consumption of the booting physical machine from the values of its BIOS setup items. When two or more physical machines are to boot (i.e., when a plurality of physical machines are assigned to a logical server), the boot determination unit 130 calculates normal power consumption of each of those physical machines in a similar way.

The storage unit 110 stores predefined information about power consumption during the normal operation of physical machines. This information gives, for example, a reference power consumption of physical machines, as well as increments of power consumption relative to the reference power consumption, corresponding to individual BIOS setup items. The boot determination unit 130 uses this information, together with BIOS setup data collected from the booting physical machine, to calculate normal power consumption of the booting physical machine. The boot determination unit 130 similarly calculates normal power consumption of other physical machines that belong to the same resource pool as the booting physical machine. The boot determination unit 130 compares the total power consumption of the booting physical machine and the other physical machines in the same resource pool with the registered value of normal power limit in the power condition management table 115, thus achieving the test of Item No. 3. For more specific algorithms of the test method, see the previous description of the second test logic (reword "boot-time power consumption" to "normal power consumption" as well as "maximum power limit" to "normal power limit").

The fourth test logic in Item No. 4 evaluates the arrangement of physical machines in terms of whether their network connections can be isolated. This is achieved by testing whether all physical machines connected to a particular switch are serving the same tenant. More specifically, boot determination unit 130 first consults the physical machine management table 111 to identify a switch to which the booting physical machine is connected. Here the identified switch may be connected to one or more physical machines.

The boot determination unit 130 then determines whether those physical machines are serving a single tenant or several different tenants.

The fifth test logic in Item No. 5 evaluates the distance between a disk and a physical machine in terms of whether the distance falls within an allowable range. More specifically, the currently booting physical machine is used together with assigned HDDs to deploy a logical server. The boot determination unit 130 identifies a disk box accommodating these HDDs by consulting the BIOS setup of the booting physical machine. The boot determination unit 130 then obtains the distance between the booting physical machine and the identified disk box and determines whether the distance falls within a relevant limit registered in the disk distance constraint table 117. See the previous description of FIG. 14 for the definition of "distance." Suppose, for example, that the physical machine 200 is assigned some HDDs in the disk box 22*b*. In this case, their distance is calculated to be two because of the presence of two intervening DANs between the physical machine 200 and disk box 22*b*.

As illustrated in FIG. 14, the disk distance constraint table 117 has two kinds of distance limits, i.e., system disk distance and data disk distance. The former is applied to the distance between a physical machine and an HDD allocated as a system disk, and latter is applied to the distance between a physical machine and an HDD allocated as a data disk. In this case, the boot determination unit 130 considers the constraint as being satisfied only if both of these distances are within their respective upper limits. In other words, the constraint will not be satisfied if the system disk or data disk fails to meet the requirement.

Further, the management apparatus 100 has to deal with the case where a plurality of physical machines are used to provide a single logical server. That is, the above-described distance test is performed for each of those host physical machines. The boot determination unit 130 considers the constraint as being satisfied only if all the host physical machines pass the distance test. In other words, the constraint will not be satisfied if any one of those machines fails to meet the requirement.

Upon detection of booting of a physical machine (or a logical server), the management apparatus 100 uses all or part of the above-described test logics to determine whether the system constraints are satisfied, on the basis of configuration parameters collected from physical machines, as well as various tables discussed in FIGS. 8 to 15.

The test logic and constraints discussed above are merely an example, and it is not intended to limit the embodiments by that specific example. For instance, the management apparatus 100 may incorporate another constraint that rejects a change of Media Access Control (MAC) address of a communication interface in a physical machine, along with another test logic for checking consistency of MAC address. This constraint works as a protection against an attempt of changing MAC address by a tenant, which could cause a problem in the operation of software, including middleware and applications. The proposed management apparatus 100 accepts other constraints and corresponding test logics.

The information processing system of the second embodiment provides flexibility for the tenants to modify the BIOS setup of their physical machines, connection of HDDs, and other things. These modifications may affect the physical machine management table 111, disk management table 112, and logical server management table 113. Accordingly, the management apparatus 100 supervises such modification and reconfiguration by the tenants, so as to keep the system constraints. The following description will discuss specific processes that the management apparatus 100 performs, assuming that a physical machine 200 is about to boot up. The person skilled in the art will appreciate that the same description also applies to other physical machines.

FIG. 16 is a flowchart illustrating an example of how the management apparatus 100 works in the second embodiment. Each operation in FIG. 16 is described below in the order of step numbers.

(S11) The boot detection unit 120 receives a DHCP request from a physical machine 200. As described previously, the management apparatus 100 has the functions of DHCP server, while the physical machine 200 acts as a DHCP client. Immediately after starting bootup, the physical machine 200 (DHCP client) tries to communicate with the DHCP server in order to obtain an Internet Protocol (IP) address. The management apparatus 100 receives a DHCP request as one of the messages that the DHCP client transmits. The reception of a DHCP request from the physical machine 200 signifies that a boot process is running in the physical machine 200, and the boot detection unit 120 thus notifies the boot determination unit 130 of the detection of booting. Here the booting of the physical machine 200 also means that a logical server 400 is about to boot.

(S12) The boot determination unit 130 collects BIOS setup data from the physical machine 200. The BIOS setup data includes information about operation modes of CPU and other devices, as well as the identifiers of HDDs that the physical machine 200 will use. The boot determination unit 130 updates the BIOS setup history table 114 accordingly. More specifically, the boot determination unit 130 transfers the current content of Latest BIOS Configuration field to Previous BIOS Configuration field and then overwrites the Latest BIOS Configuration field with the collected BIOS setup data.

(S13) Based on the BIOS setup data collected at step S12, the boot determination unit 130 determines whether the booting of the physical machine 200 satisfies constraints on the system. When the constraints are satisfied, the process advances to step S14. Otherwise, the process branches to step S16. Here the boot determination unit 130 uses the foregoing constraint test logic data 118 to test the constraints. The details of this test logic have been described above with reference to FIG. 15. The boot determination unit 130 may use one or more test items seen in the constraint test logic data 118. In the case where a plurality of test items are used, the boot determination unit 130 concludes that the constraints are satisfied when all test results are affirmative. Stated in reverse, one negative test result would make the boot determination unit 130 conclude that the constraints are not satisfied.

(S14) The boot determination unit 130 updates the logical server management table 113 according to the result of step S13. More specifically, when step S13 has calculated new values of boot-time power consumption and normal power consumption of the logical server 400, those data fields in the logical server management table 113 are updated with the new values. When step S13 has calculated boot-time power consumption and normal power consumption of the logical server 400 for the first time, the boot determination unit 130 populates those data fields in the logical server management table 113 with the calculated values.

(S15) The boot determination unit 130 permits the physical machine 200 to continue its boot process. More specifically, the boot determination unit 130 causes the DHCP server in the management apparatus 100 to return a DHCP reply as a response message to the DHCP request received at step S11. The management apparatus 100 thus sends the physical machine 200 a DHCP reply and exits from the process of FIG. 16.

(S16) The boot determination unit 130 controls the booting of the physical machine 200 so as not to use the current BIOS setup (changed BIOS setup). More specifically, the boot determination unit 130 requests the BIOS reconfiguration unit 140 to put the current BIOS setup of the physical machine 200 back to the previous BIOS setup. The BIOS reconfiguration unit 140 consults the physical machine management table 111 and BIOS setup history table 114 to retrieve a previous generation of BIOS setup saved for the physical machine 200 (logical server 400). The retrieved BIOS setup is sent to the physical machine 200 (or to the controller 300) for the purpose of restoration. The BIOS reconfiguration unit 140 commands the physical machine 200 to reboot with the restored setup. The physical machine 200 accordingly reboots with its previous BIOS setup. Since the BIOS setup has reverted, the boot determination unit 130 updates the BIOS setup history table 114 by overwriting the Latest BIOS Configuration field with the values of the Previous BIOS Configuration field.

In the way described above, the proposed management apparatus 100 supervises each tenant's action of modification and reconfiguration, so as not to violate the system constraints. When it finds a violation of a constraint about network isolation (see Item No. 4 of the constraint test logic data 118), the boot determination unit 130 may skip step S16 and cancel the booting of the physical machine 200. As another option, the boot determination unit 130 may command the controller 300 to select and boot another physical machine equivalent to the physical machine 200 in terms of machine specifications. This alternative machine has to be connected to a different switch. The management apparatus 100 then executes the same procedure of FIG. 16 for the newly booted physical machine.

Referring again to step S16 of the above procedure, the management apparatus 100 makes the physical machine 200 reboot with a previous configuration used before a change is made. This is because of its high likelihood of satisfying constraints. The management apparatus 100 may iterate the same procedure of FIG. 16 after rebooting the physical machine 200 with its previous configuration. It is still possible, however, that the test of step S13 also rejects the previous configuration as violating constraints. The boot determination unit 130 may entirely cancel the attempt of booting in that case.

As a variation of step S12, the boot determination unit 130 may collect BIOS setup data, not only from the booting physical machine 200, but also from other physical machines that are subject to the constraint test of step S13 (e.g., those in the resource pool 20). In this case, step S13 is also modified to reevaluate the boot-time power consumption and normal power consumption of those physical machines. The logical server management table 113, on the other hand, may not need to record the values of boot-time power consumption and normal power consumption of each logical server.

Regarding step S11, it is noted that one logical server may be build on a plurality of host physical machines. The boot detection unit 120 thus detects booting of multiple physical machines assigned to such a logical server. This information is passed from the boot detection unit 120 to the boot determination unit 130. The management apparatus 100 executes step S12 and subsequent steps for all those booting physical machines.

The next section describes a procedure executed on the part of a physical machine, opposite to the procedure of FIG. 16. While it is assumed again that the physical machine 200 is to boot up, the following procedure also applies to other physical machines.

Figure 17:
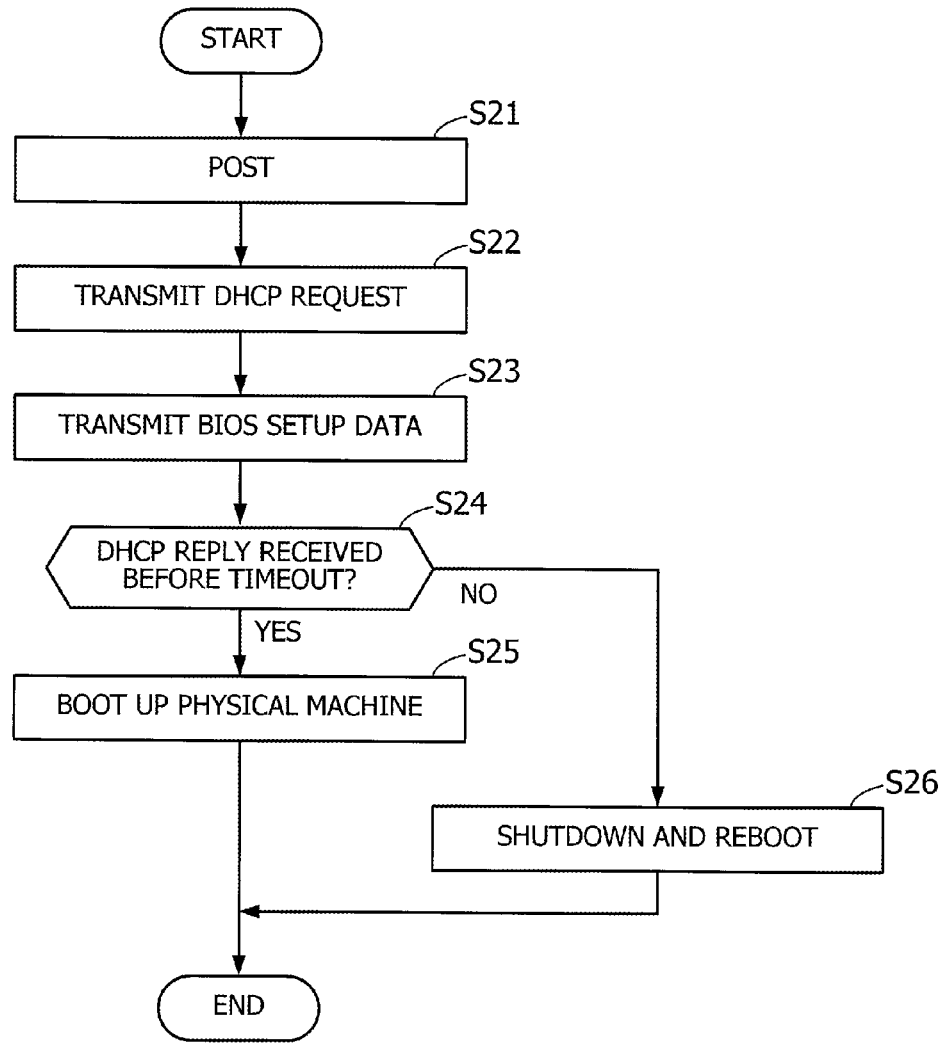
FIG. 17 is a flowchart illustrating an example of how the physical machines work in the second embodiment.

FIG. 17 is a flowchart illustrating an example of how the physical machines work in the second embodiment. Each operation in FIG. 17 is described below in the order of step numbers. The physical machine 200 initiates this process from step S21 when the controller 300 starts up a logical server 400 on the physical machine 200.

(S21) The BIOS 220 executes a POST procedure.

(S22) The BIOS 220 transmits a DHCP request to the management apparatus 100.

(S23) The BIOS setting unit 230 transmits BIOS setup data to the management apparatus 100. This step S23 corresponds to step S12 in FIG. 16. For example, the BIOS setting unit 230 may be configured to transmit BIOS setup data either in response to a request from the management apparatus 100 or as accompanying data that follows the DHCP request.

(S24) The BIOS 220 waits for a DHCP reply from the management apparatus 100 as a response to the DHCP request transmitted at step S22. When a DHCP reply is received before expiration of its timeout period, the process advances to step S25. When the timeout period expires with no DHCP reply, the process branches to step S26.

(S25) The BIOS 220 continues the boot process of the physical machine 200 and exits from the procedure of FIG. 17.

(S26) The BIOS 220 shuts down the physical machine 200 and reboots it with a previous generation of BIOS setup that is saved in the management apparatus 100. To this end, the BIOS setting unit 230 obtains such BIOS setup directly from the management apparatus 100 or with an intervention of the controller 300 and stores it in the storage unit 210 (a storage space of the flash memory 204), so that the BIOS 220 will be able to load the previous configuration from the storage unit 210 when the physical machine 200 reboots.

The above procedures of FIGS. 16 and 17 permit the physical machine 200 to start bootup and the management apparatus 100 to test the constraints. When the constraints are satisfied, the physical machine 200 is allowed to continue its boot process. Otherwise, the physical machine 200 is rebooted with a previous configuration.

The proposed information processing system of the second embodiment allows the tenants to flexibly change the configuration of leased physical machines depending on their intended use of the system. However, this flexibility also means a potential risk that one user's reconfiguration would result in a violation of some constraints on the hardware of the system and thus affect the behavior of another user's physical machine. For example, hardware constraints about power supply and network switch connections are important for the system because they play a fundamental role in ensuring proper operation of physical machines. If some physical machines stop their service as a result of violation of system constraints in a physical IaaS environment, it means that the service provider has failed to fulfill the SLA with their users.

One thing to note here is that some kinds of hardware reconfiguration (e.g., changing setup of firmware, including BIOS) necessitate rebooting of the physical machine in order to effect its new setup. Even if the modified configuration satisfies system constraints at the moment of registration, this fact would not guarantee that the same setup also works well in the next bootup of the physical machine, because each tenant's usage of physical machines varies with time.

Suppose, for example, that a certain resource pool encounters an excessive increase of power consumption. This event makes it difficult to continue the current operation of physical machines offered by that resource pool. As another example, running a machine with a network configuration that strays outside the bounds of security constraints would spoil the secureness of other machines.

In view of the above, the proposed management apparatus 100 collects configuration parameters relating to the BIOS and firmware from a group of physical machines, upon bootup of one of those machines. The management apparatus 100 determines whether the collected parameters satisfy constraints on the system and controls whether to continue or discontinue the ongoing boot process, depending on the result of the determination. This feature avoids startup of a machine with an inappropriate setup that would otherwise cause the system to violate its constraints.

When it has determined to discontinue the current boot process of a physical machine, the management apparatus 100 causes the booting physical machine to restore its previous configuration and try to boot with the restored setup. This feature of the management apparatus 100 permits the tenant to use the machine without interruption.

As discussed in a previous example, a set of particular values of BIOS setup and firmware setup may constitute a constraint. The constraints of this type are used to reflect the service agreement of each tenant, so that their physical machines can be operated properly in accordance with the agreement. Other constraints may be directed to management of power consumption, so as to ensure the stable operation of leased physical servers in the system as a whole. Those constraints about power consumption contribute to power-saving operations of resource pools 20 and 20*a*.

Yet another constraint serves the feature of network isolation between tenants. Network isolation eliminates the risk of interception of communications, thus providing an improved security. Still another constraint limits the distance between physical machines and their assigned disks. This constraint contributes to a reduced overhead in the communication between physical machines and disks, besides ensuring the performance of disk access.

(c) Third Embodiment

This section describes a third embodiment. The following description will focus on its differences from the foregoing second embodiment. See the previous sections for their common features.

The third embodiment provides the function of applying reconfiguration of one physical machine to other physical machines, so as to ensure that the system as a whole keeps its constraints even if they could be violated by bootup of a new physical machine. The information processing system proposed in the third embodiment is similar to that of the second embodiment discussed in FIG. 2. The third embodiment is, however, different from the second embodiment in the structure of its management apparatus 100*a*. The management apparatus 100*a* of the third embodiment may be built on a hardware platform similar to that of the management apparatus 100 discussed in FIG. 3.

Figure 18:
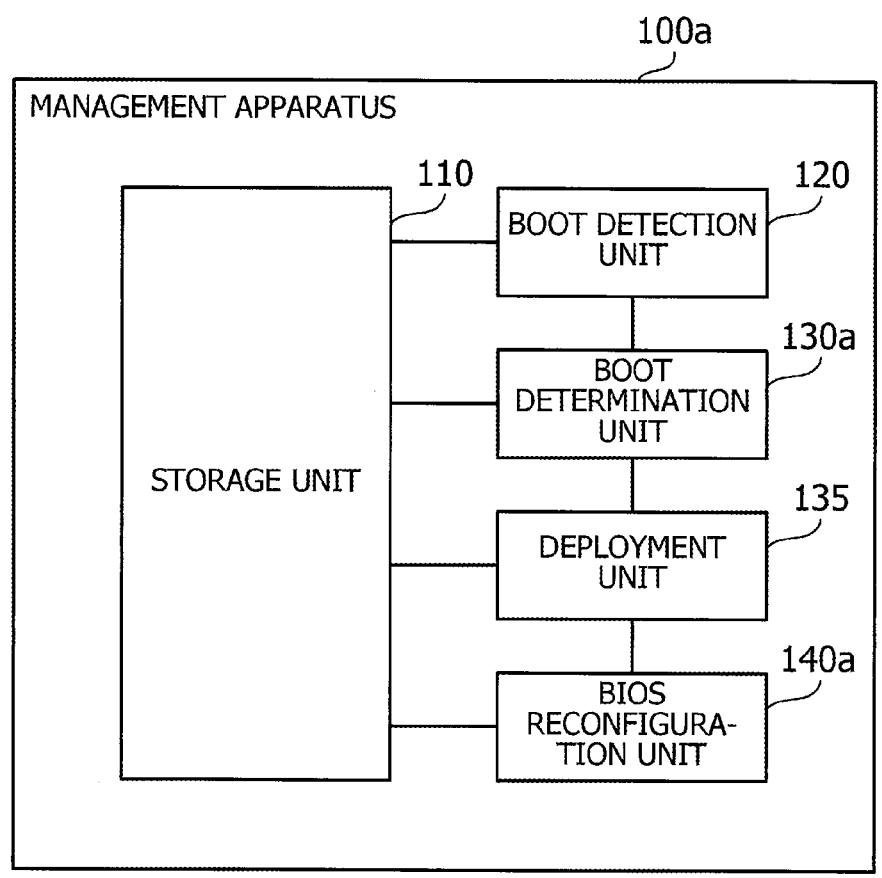
FIG. 18 illustrates an example of functions provided in a management apparatus according to a third embodiment.

FIG. 18 illustrates an example of functions provided in a management apparatus according to the third embodiment. The functions seen in FIG. 18 may be realized by executing programs therefor with a processor (not illustrated) in the management apparatus 100*a*. Specifically, the illustrated management apparatus 100*a* includes a storage unit 110, a boot detection unit 120, a boot determination unit 130*a*, a deployment unit 135, and a BIOS reconfiguration unit 140*a*. The storage unit 110 and boot detection unit 120 are similar to their counterparts in the foregoing management apparatus 100 of the second embodiment.

The boot detection unit 120 informs the boot determination unit 130*a* of the physical machine that is booting. The boot determination unit 130*a* then communicates with this booting physical machine to collect its configuration parameters of BIOS and logical servers.

The boot determination unit 130*a* also consults the storage unit 110 to retrieve data about other physical machines, as well as information about constraints that are supposed to be fulfilled. Based on the retrieved machine data and constraint information, the boot determination unit 130*a* determines whether the constraints are still satisfied when the noted physical machine is fully booted.

When it is found that a system constraint would be violated by bootup of a physical machine, the deployment unit 135 searches the physical machine management table 111 and logical server management table 113 for an alternative physical machine that satisfies the constraint. This alternative physical machine is to replace the originally booting physical machine. The deployment unit 135 thus requests the BIOS reconfiguration unit 140*a* to boot up the alternative physical machine with the changed BIOS setup.

The tenants may configure the BIOS of their physical machines, as well as setting up their logical servers. The BIOS reconfiguration unit 140*a* receives such configuration data from client devices 40 and 40*a* and stores it in the storage unit 110. The BIOS reconfiguration unit 140*a* may also send a changed BIOS setup to a physical machine to be booted, when so requested by the deployment unit 135.

The following description explains a procedure performed by the management apparatus 100*a*, assuming that a physical machine 200 is about to boot up. The person skilled in the art will appreciate that the same description also applies to other physical machines.

Figure 19:
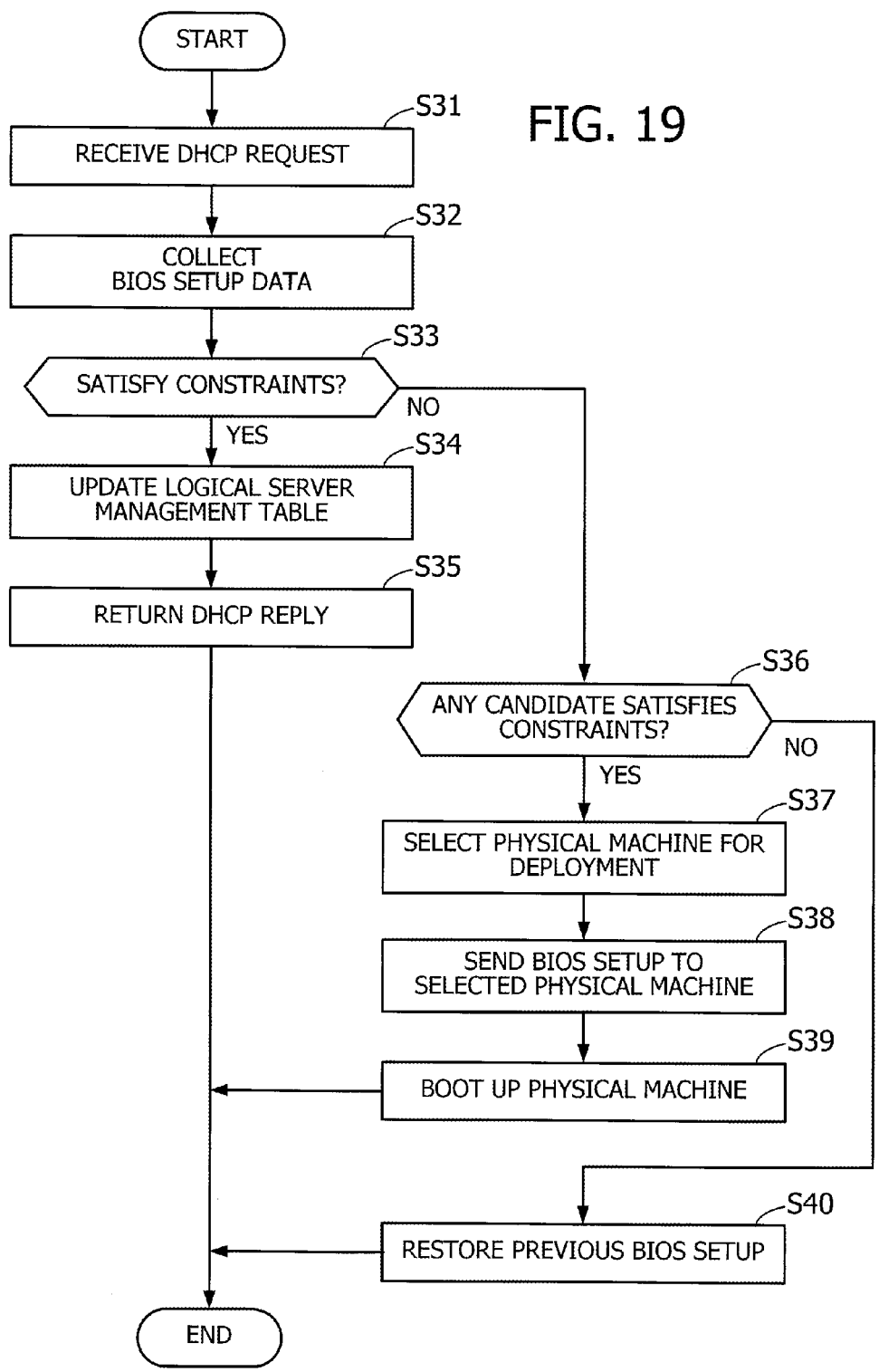
FIG. 19 is a flowchart illustrating an example of how the management apparatus works in the third embodiment.

FIG. 19 is a flowchart illustrating an example of how the management apparatus works in the third embodiment. Each operation in FIG. 19 is described below in the order of step numbers.

(S31) The management apparatus 100*a* receives a DHCP request from a physical machine 200 that is booting. The reception of this DHCP request signifies that a boot process is running in the physical machine 200, and the boot detection unit 120 thus notifies the boot determination unit 130*a* of the detection of booting.

(S32) The boot determination unit 130*a* collects BIOS setup data from the physical machine 200 and updates the BIOS setup history table 114 with the collected data. More specifically, the boot determination unit 130*a* transfers the current content of Latest BIOS Configuration field to Previous BIOS Configuration field and then overwrites the Latest BIOS Configuration field with the collected BIOS setup data.

(S33) Based on the BIOS setup data collected at step S32, the boot determination unit 130*a* determines whether the booting of the physical machine 200 satisfies constraints on the system. Here the boot determination unit 130*a* uses the same method discussed previously for step S13 of the second embodiment. When the constraints are satisfied, the process advances to step S34. Otherwise, the boot determination unit 130*a* so notifies the deployment unit 135 and moves the process to step S36.

(S34) The boot determination unit 130*a* updates the logical server management table 113 according to the result of step S33. More specifically, when step S33 has calculated new values of boot-time power consumption and normal power consumption of the logical server 400, the boot determination unit 130*a* updates those data fields in the logical server management table 113 with the new values. When step S33 has calculated boot-time power consumption and normal power consumption of the logical server 400 for the first time, the boot determination unit 130*a* populates those data fields in the logical server management table 113 with the calculated values.

(S35) The boot determination unit 130*a* permits the physical machine 200 to continue its boot process. More specifically, the boot determination unit 130*a* causes the DHCP server in the management apparatus 100*a* to return a DHCP reply as a response message to the DHCP request received at step S31. The management apparatus 100*a* thus sends the physical machine 200 a DHCP reply and exits from the procedure of FIG. 19.

(S36) Now that a new selection of physical machines is needed to accomplish the deployment of a logical server, the deployment unit 135 determines whether there is any such candidate physical machine that satisfies the constraints. If such a candidate is found, the process advances to step S37. If not, the deployment unit 135 so notifies the boot determination unit 130*a* and moves the process to step S40.

At this step, the deployment unit 135 consults the physical machine management table 111 and logical server management table 113 to find one or more candidate physical machines. More specifically, in the case where the above step S33 has found an excessive boot-time power consumption or normal power consumption, the deployment unit 135 searches the resource pool 20*a* to extract an alternative physical machine that resembles the physical machine 200 in terms of machine specifications and has no assigned logical servers. The deployment unit 135 determines whether the extracted physical machine satisfies the constraints (upper limits for boot-time power consumption and normal power consumption), assuming that the same BIOS setup of the physical machine 200 is used. This test is done in a similar way to the foregoing steps S13 and S33. If the constraints are satisfied, the deployment unit 135 chooses the extracted physical machine as a candidate physical machine. In this way, the deployment unit 135 may find a plurality of candidate physical machines.

(S37) The deployment unit 135 selects a new physical machine for deployment from among the candidate physical machines and informs the BIOS reconfiguration unit 140*a* of the selection. For example, the deployment unit 135 may consult the physical machine management table 111 to choose one of the candidate physical machines that has the smallest number in the physical machine ID field.

(S38) The BIOS reconfiguration unit 140*a* sends the BIOS setup to the physical machine selected above for the deployment (or to the controller of a resource pool accommodating that physical machine).

(S39) The BIOS reconfiguration unit 140*a* issues a command for booting up the determined physical machine. This command goes to the controller of a resource pool accommodating that physical machine. The management apparatus 100*a* then exits from the process of FIG. 19.

(S40) The boot determination unit 130*a* controls the physical machine 200 so as to discontinue its boot process with the current BIOS setup (or changed BIOS setup). More specifically, the boot determination unit 130*a* requests the BIOS reconfiguration unit 140*a* to put the current BIOS setup of the physical machine 200 back to the previous BIOS setup. In response, the BIOS reconfiguration unit 140*a* consults the physical machine management table 111 and BIOS setup history table 114 to retrieve a previous generation of BIOS setup for the physical machine 200 (logical server 400). The BIOS reconfiguration unit 140*a* sends the retrieved BIOS setup to the physical machine 200 (or to the controller 300) for the purpose of restoration and then commands the physical machine 200 to reboot with the restored setup. The physical machine 200 reboots accordingly. Since the BIOS setup has reverted, the boot determination unit 130*a* updates the BIOS setup history table 114 by overwriting the Latest BIOS Configuration field with the values of the Previous BIOS Configuration field.

As can be seen from the above, the proposed management apparatus 100*a* of the third embodiment is designed to select an alternative physical machine that satisfies system constraints, which would otherwise be violated by bootup of the originally selected physical machine 200. The management apparatus 100*a* causes the newly selected physical machine to boot up with the BIOS setup originally intended for the physical machine 200. This features of the management apparatus 100*a* enables smooth deployment of logical server environments for use by the tenants, while satisfying constraints on the system.

It is noted here that the management apparatus 100*a* may have to deal with the case where a plurality of physical machines are assigned to a logical server. In that case, the boot detection unit 120 detects booting of multiple physical machines at step S31 and so notifies the boot determination unit 130*a*. The management apparatus 100*a* executes step S32 and subsequent steps for each of those physical machines.

(d) Fourth Embodiment

This section describes a fourth embodiment. The following description will focus on its difference from the foregoing second embodiment. See the previous sections for their common features.

Briefly, the fourth embodiment provides a function for verifying configuration of a physical machine in terms of whether it satisfies constraints on the system, before the physical machine starts to reboot.

Figure 20:
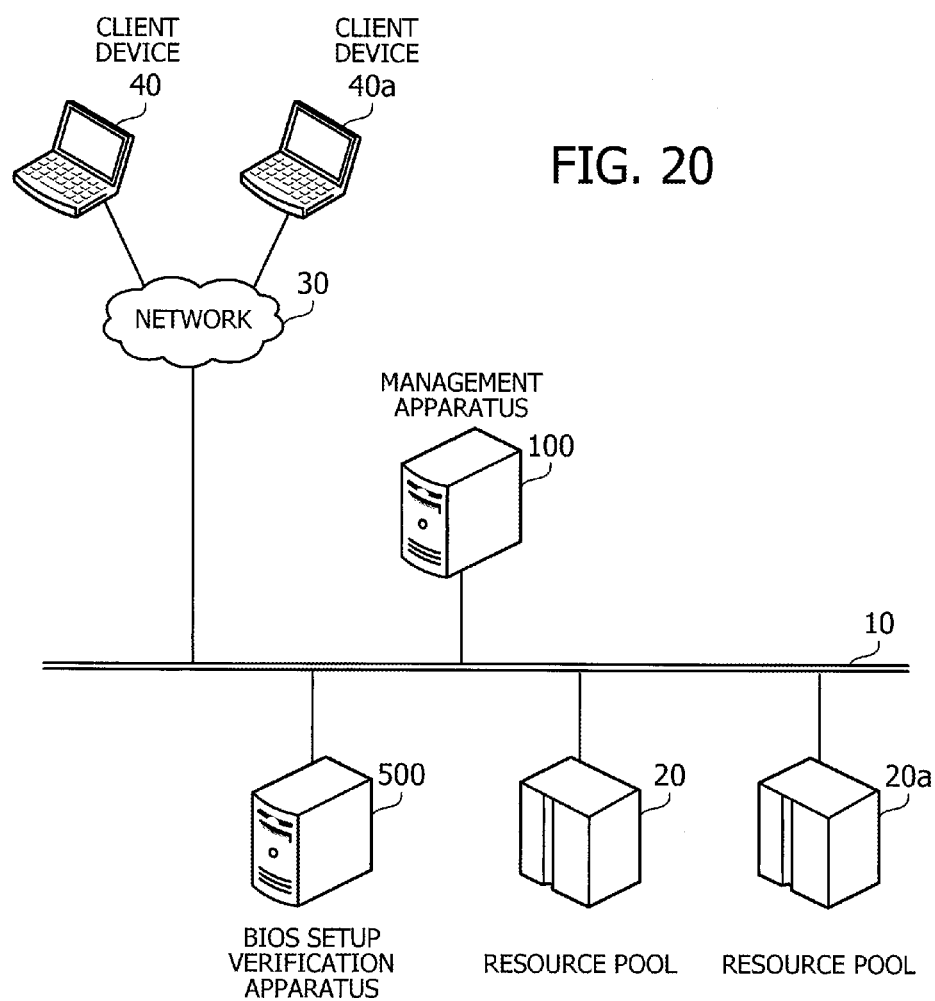
FIG. 20 illustrates an example of an information processing system according to a fourth embodiment.

FIG. 20 illustrates an example of an information processing system according to the fourth embodiment. The illustrated information processing system includes resource pools 20 and 20*a*, client devices 40 and 40*a*, a management apparatus 100, and a BIOS setup verification apparatus 500. The management apparatus 100, resource pools 20 and 20*a*, and BIOS setup verification apparatus 500 are connected to a network 10. The client devices 40 and 40*a* are connected to another network 30. There is a link between the two networks 10 and 30.

The resource pools 20 and 20*a*, client devices 40 and 40*a*, and management apparatus 100 are similar to their respective counterparts discussed in FIG. 2 for the second embodiment. The management apparatus 100 in the fourth embodiment is, however, configured to receive some information from the BIOS setup verification apparatus 500. This information indicates what change is made to the configuration of physical machines in the resource pools 20 and 20*a*.

The BIOS setup verification apparatus 500 is a server computer that works together with the management apparatus 100 to verify a change of the BIOS setup of a physical machine in the resource pools 20 and 20*a* in terms of the conformity to system constraints, before booting or rebooting the physical machine in question. The BIOS setup verification apparatus 500 also provides client devices 40 and 40*a* with a GUI for the users to modify the setup of a physical machine. For example, the BIOS setup verification apparatus 500 may have web server functions to provide web pages implementing such a GUI. In this case, the management apparatus 100 is allowed to eliminate its web server functions. The BIOS setup verification apparatus 500 may be built on a hardware platform similar to that of the management apparatus 100 discussed in FIG. 3.

Figure 21:
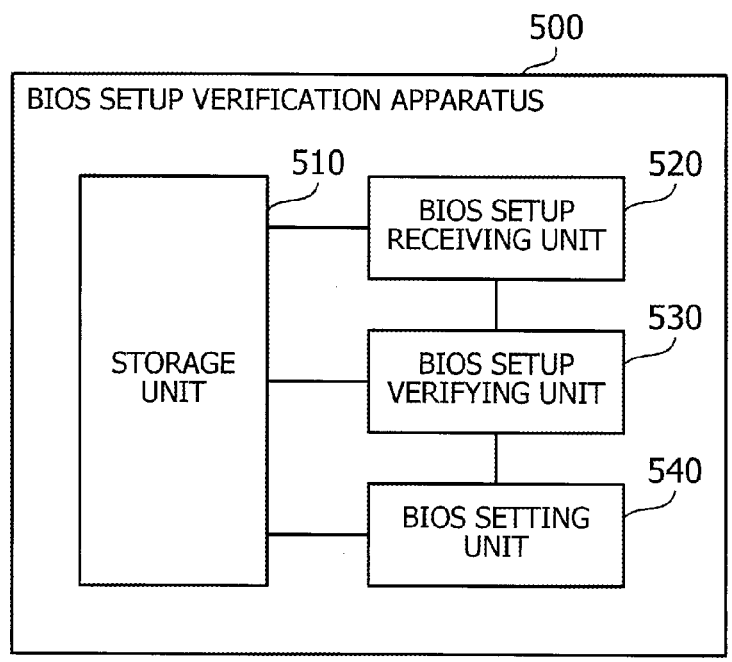
FIG. 21 illustrates an example of functions provided by a BIOS setup verification apparatus in the fourth embodiment.

FIG. 21 illustrates an example of functions provided by a BIOS setup verification apparatus in the fourth embodiment. The functions seen in FIG. 21 may be realized by executing programs therefor with a processor (not illustrated) in the BIOS setup verification apparatus 500. Specifically, the illustrated BIOS setup verification apparatus 500 includes a storage unit 510, a BIOS setup receiving unit 520, a BIOS setup verifying unit 530, and a BIOS setting unit 540.

The storage unit 510 may be implemented as a storage space reserved in a RAM or HDD (not illustrated) in the BIOS setup verification apparatus 500. The storage unit 510 stores BIOS setup data of each physical machine that the BIOS setup receiving unit 520 has received.

The BIOS setup receiving unit 520 receives a BIOS reconfiguration request for a physical machine from client devices 40 and 40a, which contains a specific change to be made to the BIOS setup of that machine. The BIOS setup receiving unit 520 stores the received change of BIOS setup in the storage unit 510 as a record relating to the intended physical machine or logical server.

The BIOS setup verifying unit 530 forwards the received change of BIOS setup to the management apparatus 100 and queries whether the change satisfies constraints on the system. If the system constraints are satisfied, the BIOS setup verifying unit 530 hands over the processing task to the BIOS setting unit 540 so as to effect the change of BIOS setup in the intended physical machine. The received change of BIOS setup may include some specific conditions for running the physical machine (e.g., a time range in which the physical machine can be used without violating system constraints). In this case, the BIOS setup verifying unit 530 informs the requesting client device of such conditions (referred to as "acceptance conditions").

The BIOS setting unit 540, responsive to a request from the BIOS setup verifying unit 530, loads the intended physical machine with a changed BIOS setup. More specifically, the changed BIOS setup is registered in the flash memory of the physical machine.

The following description will explain a procedure executed by the BIOS setup verification apparatus 500, assuming that the BIOS setup of a physical machine 200 is changed. The person skilled in the art will appreciate that the same description also applies to other physical machines.

Figure 22:
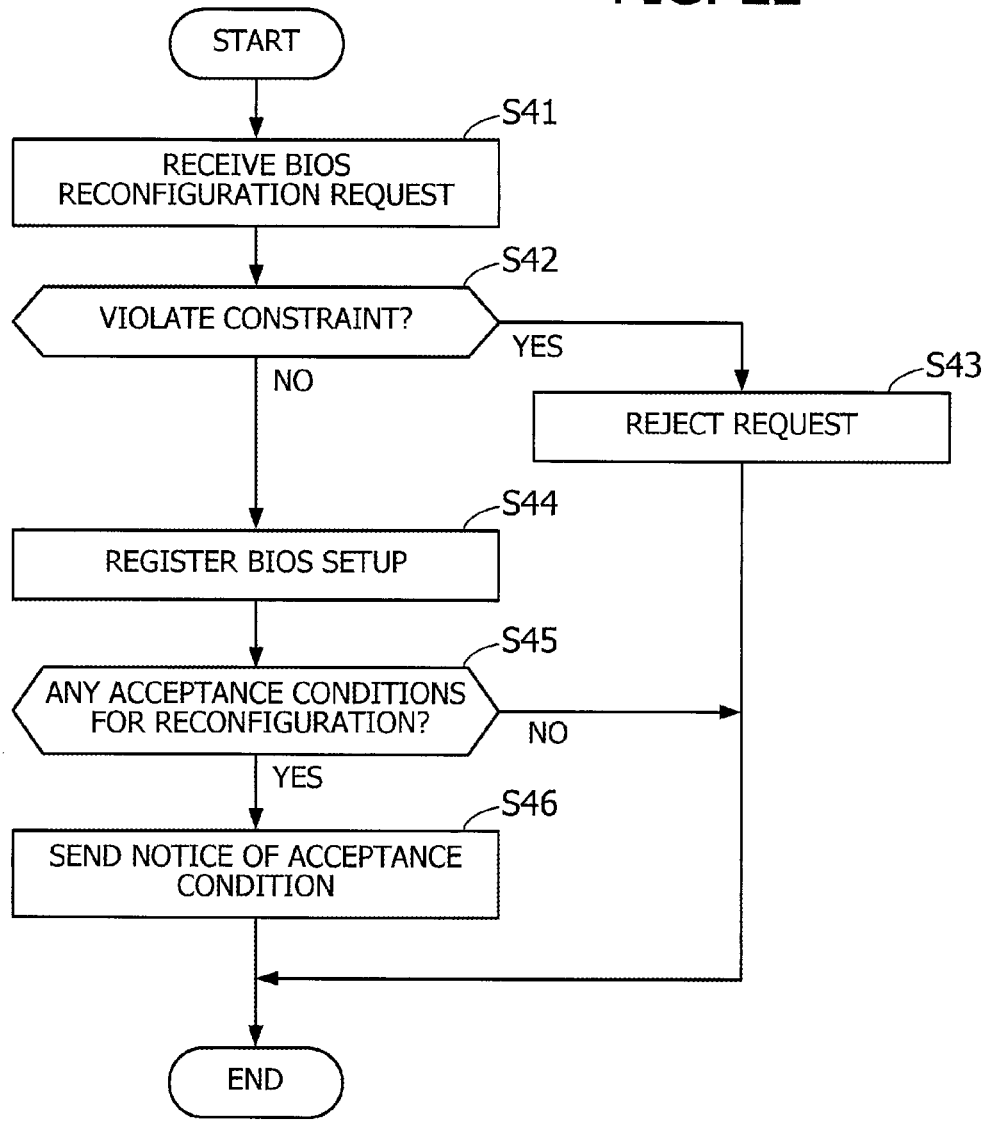
FIG. 22 is a flowchart illustrating an example of a process performed in the fourth embodiment.

FIG. 22 is a flowchart illustrating an example of a process performed in the fourth embodiment. Each operation in FIG. 22 is described below in the order of step numbers.

(S41) The BIOS setup receiving unit 520 receives a BIOS reconfiguration request from a client device 40. This request specifies a change of BIOS setup of a physical machine 200. The BIOS setup receiving unit 520 extracts the change from the received BIOS reconfiguration request and stores it in the storage unit 510.

(S42) The BIOS setup verifying unit 530 forwards the change of BIOS setup to the management apparatus 100 and queries whether the change includes any item that violates a constraint on the system. In response, the management apparatus 100 first identifies a logical server 400 corresponding to the physical machine 200 of interest. The management apparatus 100 tests whether the received change of BIOS setup includes any item that violates relevant constraints defined in the BIOS setup management table 116, and informs the BIOS setup verification apparatus 500 of the result. This test is what has been described previously as the first test logic (Item No. 1) in the constraint test logic data 118. When the received change of BIOS setup causes no violation of constraints, the process advances to step S44. When the change includes an item that causes a violation of constraints, the process branches to step S43.

(S43) The BIOS setup verifying unit 530 rejects the BIOS reconfiguration request, informing the requesting client device 40 that the change of BIOS setup includes an item that violates a constraint on the system. That is, the BIOS setup verifying unit 530 determines not to apply the requested change to the physical machine 200. The BIOS setup verification apparatus 500 exits from the process of FIG. 22.

(S44) The BIOS setting unit 540 effects the requested change of BIOS setup in the physical machine 200 as specified in the BIOS reconfiguration request. For example, the BIOS setting unit 540 sends the change to the controller 300 and requests the controller 300 to register the change in the flash memory 204 of the physical machine 200. Alternatively, the BIOS setting unit 540 may send the change directly to the physical machine 200 for registration in its local flash memory 204. The physical machine 200 is now ready to boot with the changed BIOS setup.

(S45) The requested change of BIOS setup has been applied to the physical machine 200. The BIOS setup verifying unit 530 sends a query to the management apparatus 100 as to whether the above change of BIOS setup is accompanied by any acceptance conditions. The management apparatus 100 processes the query with reference to the logical server management table 113 and returns the result to the BIOS setup verification apparatus 500. For example, the management apparatus 100 determines the presence of acceptance conditions by using the test logic discussed previously in Item Nos. 2, 3 and 4 of the constraint test logic data 118. For example, the noted physical machine (logical server) may only be used in a limited period because of some specific requirements for power consumption or network isolation. Such a limitation on service period constitutes an acceptance condition. In other words, the noted physical machine would become unavailable to the tenant after the expiration of a service period specified in the acceptance condition. When such an acceptance condition is found, the BIOS setup verifying unit 530 advances the process to step S46. When there is no particular acceptance condition, the process of FIG. 22 is closed.

(S46) The BIOS setup verifying unit 530 informs the client device 40 of the acceptance condition. For example, the tenant receives a message about the acceptance condition on the screen of their client device 40.

Figure 23:
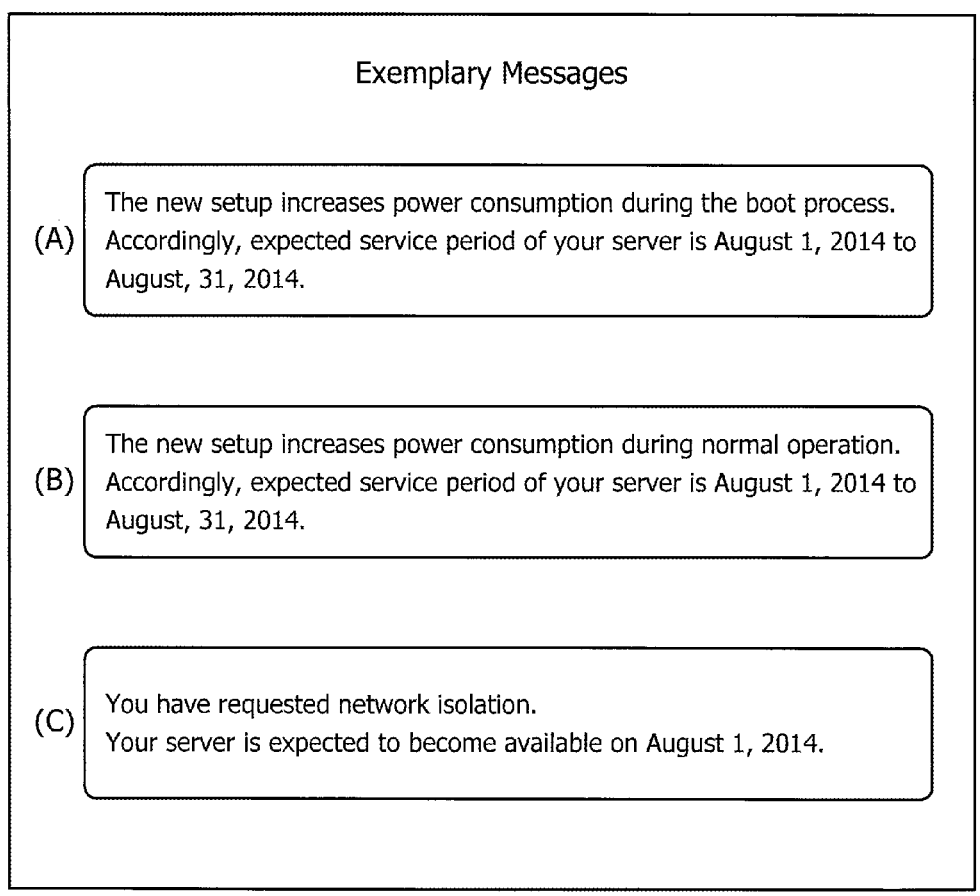
FIG. 23 illustrates an example of messages presented in the fourth embodiment.

FIG. 23 illustrates an example of messages presented in the fourth embodiment. Specifically, part (A) of FIG. 23 illustrates a message sent to a client device in the case where an acceptance condition about boot-time power consumption has been produced as a result of BIOS reconfiguration of a physical machine. For example, the BIOS setup verifying unit 530 sends the client device a message that says: "The new setup increases power consumption during the boot process," and "Accordingly, expected service period of your server is Aug. 1, 2014 to Aug. 31, 2014."

The management apparatus 100 obtains the acceptance condition seen in part (A) of FIG. 23 in the following way. The management apparatus 100 maintains information about boot-time power consumption in its storage unit 110. This information gives, for example, a reference power consumption of physical machines at the time of bootup, as well as increments of power consumption relative to the reference power consumption, corresponding to individual BIOS setup items. The boot determination unit 130 uses this information, together with BIOS setup data collected from the booting physical machine, to calculate boot-time power consumption of a newly booting physical machine. The management apparatus 100 may similarly calculate boot-time power consumption of other physical machines that belong to the same resource pool as the booting physical machine. The management apparatus 100 compares the total power consumption of the booting physical machine and other physical machines in the same resource pool with the registered value of maximum power limit in the power condition management table 115. This comparison is performed at different time points in the lease period of the booting physical machine.

As mentioned above, the management apparatus 100 checks whether the physical machines keep their power limit at multiple time points in the lease period of the booting physical machine. Referring to the exemplary logical server management table 113 in FIG. 10, suppose now that the controller 300 is to boot a physical machine 200 to provide a logical server 400 (logical server ID "3") for a tenant in a lease period of Jul. 15, 2014 to Jul. 31, 2014. Assuming that the present date is Jul. 20, 2014, the management apparatus 100 scans the logical server management table 113 to extract logical servers that may be booted from the resource pool 20 during a time window of Jul. 20, 2014 to Jul. 31, 2014. Some of these logical servers have overlapping lease periods during the time window. The management apparatus 100 then adds up the boot-time power consumption of physical machines assigned to such logical servers with overlapping lease periods. The resulting total power consumption varies from day to day and may exceed the predetermined maximum power limit. The management apparatus 100 determines whether there is a moment of such excessive power consumption in the above time window. The foregoing concept of acceptance condition is related to this calculation of power consumption. That is, the acceptance condition holds true in a time period when no excessive power consumption is expected. Stated in reverse, an excessive power consumption breaks the acceptance condition.

Part (B) of FIG. 23 illustrates a message sent to a client device in the case where an acceptance condition about run-time power consumption (normal power consumption) has been produced as a result of BIOS reconfiguration of a physical machine. For example, the BIOS setup verifying unit 530 sends the client device a message that says: "This new setup increases power consumption during normal operation," and "Accordingly, expected service period of your server is Aug. 1, 2014 to Aug. 31, 2014."

The management apparatus 100 obtains the second acceptance condition seen in part (B) of FIG. 23 in the same way as it does for the first acceptance condition in part (A) of FIG. 23. See the previous section for details of the method, while altering the term "boot-time power consumption" to "normal power consumption" as well as "maximum power limit" to "normal power limit."

Part (C) of FIG. 23 illustrates a message sent to a client device in the case where an acceptance condition about network isolation has been produced as a result of BIOS reconfiguration of a physical machine. For example, the BIOS setup verifying unit 530 sends the client device a message that says: "You have requested network isolation," and "Your server is expected to become available on Aug. 1, 2014."

It is not possible to implement network isolation for a requesting tenant as long as other tenants are enjoying their lease periods of physical machines. The situation changes, however, when the expiration date of those tenants comes. The management apparatus 100 thus looks into the physical machine management table 111 and logical server management table 113 to obtain the expiration date of other tenants' lease periods, as well as identifying to which network switch their physical machines are connected. When the right time comes, and the network switch becomes free from other physical machines, the management apparatus 100 takes that chance to implement network isolation for the intended physical machine.

In the above example, the BIOS setup verification apparatus 500 informs the tenant of a service period that matches with the acceptance condition received from the management apparatus 100 holds true. Alternatively, the BIOS setup verification apparatus 500 may be configured to inform the tenant of a period that does not match with the acceptance condition.

The above-described fourth embodiment provides a BIOS setup verification apparatus 500 and a management apparatus 100 as separate devices. Alternatively, the BIOS setup verifying unit 530 may be implemented as part of the functions of the management apparatus 100. This means that the management apparatus 100 provides the client devices 40 and 40a with acceptance conditions such as a limited service period of a reconfigured logical server. This features of the management apparatus 100 enables smooth deployment of logical server environments for use by the tenants, while satisfying constraints on the system.

The proposed data processing of the first embodiment may be implemented as a program executed by a computation unit 1b. The proposed data processing of the second and third embodiments may be implemented as a program executed by the processor 101 in the management apparatus 100 or 100a. The proposed data processing of the fourth embodiment may be implemented as a program executed by the processor 101 or a processor in the BIOS setup verification apparatus 500. These programs may be encoded in a computer-readable storage medium 13.

For example, programs are distributed in the form of such storage media 13. As another method, programs may be stored in a storage device of a computer for distribution to other computers via a network. The user may install such programs in a local storage device (e.g., RAM 102 and DD 103) of his or her computer by reading them out of a storage medium 13 or by downloading them from a remote computer, so that the computer can execute the programs from its local storage device.

In one aspect of the embodiments discussed above, the proposed techniques make it possible to check the configuration parameters of a virtual machine or physical machine when it boots up, and control whether to continue or discontinue the boot process, depending on their conformity to given constraints.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A method for verifying configuration, comprising:
detecting, by a computer, booting of a first virtual machine or a first physical machine in a system, the first virtual machine being one of a plurality of virtual machines in the system, the first physical machine being one of a plurality of physical machines in the system;
collecting, by the computer, configuration parameters from the virtual machines or the physical machines in the system, including the first virtual machine or first physical machine whose booting has been detected;
retrieving, by the computer, information about a constraint on the system from a storage device, the constraint relating to booting of the first virtual machine or first physical machine;
first determining, by the computer, whether the collected configuration parameters satisfy the retrieved constraint;
controlling, by the computer, discontinuation of the booting of the first virtual machine or the first physical machine, depending on a result of the determining;
selecting, by the computer, a second virtual machine other than the first virtual machine, or a second physical machine other than the first physical machine;
second determining, by the computer, whether the constraint is satisfied under an assumption that the second virtual machine or second physical machine is configured and booted with the configuration parameters of the first virtual machine or first physical machine; and
booting up, by the computer, the second virtual machine or second physical machine, when the constraint is satisfied under the assumption.

2. The method according to claim 1, wherein the controlling includes:
causing the first virtual machine or the first physical machine to restore previous configuration parameters thereof, depending on the result of the determining; and
rebooting the first virtual machine or the physical machine with the restored configuration parameters.

3. The method according to claim 1, further comprising:
outputting information indicating in what period the collected configuration parameters satisfy the constraint, as well as in what period the collected configuration parameters fail to satisfy the constraint, based on information about scheduled service periods during which the virtual machines or physical machines in the system are respectively available for use.

4. The method according to claim 1, wherein:
the constraint specifies allowable values of configuration parameters for each of the virtual machines or physical machines;
the first determining includes testing whether the collected configuration parameters conform to the allowable values specified by the constraint.

5. The method according to claim 1, wherein:
the constraint specifies an upper bound of power consumption; and
the first determining includes testing whether the collected configuration parameters permit the system to conform to the upper bound specified by the constraint.

6. The method according to claim 1, wherein:
the first virtual machine or the first physical machine is used by a first user;
the plurality of virtual machines in the system includes the second virtual machine used by a second user who is different from the first user, and the plurality of physical machines in the system include the second physical machine used by the second user;
the first determining includes testing whether the first virtual machine or first physical machine shares a network switch with the second virtual machine or second physical machine used by the second user.

7. The method according to claim 1, wherein:
the constraint specifies a range of distance; and
the first determining includes calculating a distance between a third physical machine executing the first virtual machine or the first physical machine and a secondary storage device to be accessed therefrom, and testing whether the calculated distance falls within the range of distance specified in the constraint.

8. A non-transitory computer-readable medium storing a program that causes a computer to perform a procedure comprising:
detecting booting of a first virtual machine or a first physical machine in a system, the first virtual machine being one of a plurality of virtual machines in the system, the first physical machine being one of a plurality of physical machines in the system;
collecting configuration parameters from the virtual machines or the physical machines in the system, including the first virtual machine or first physical machine whose booting has been detected;
retrieving information about a constraint on the system from a storage device, the constraint relating to booting of the first virtual machine or first physical machine;
determining whether the collected configuration parameters satisfy the retrieved constraint;
controlling discontinuation of the booting of the first virtual machine or the first physical machine, depending on a result of the determining;
selecting a second virtual machine other than the first virtual machine, or a second physical machine other than the first physical machine;
determining whether the constraint is satisfied under an assumption that the second virtual machine or second physical machine is configured and booted with the configuration parameters of the first virtual machine or first physical machine; and
booting up the second virtual machine or second physical machine, when the constraint is satisfied under the assumption.

9. An apparatus for verifying configuration, the apparatus comprising:
a memory configured to store information that describes constraints relating to booting of virtual machines or physical machines in a system, and
a processor configured to perform a procedure including:
detecting booting of a first virtual machine or a first physical machine, the first virtual machine being one of the virtual machines in the system, the first physical machine being one of the physical machines in the system;
collecting configuration parameters from the virtual machines or the physical machines in the system, including the first virtual machine or first physical machine whose booting has been detected;
retrieving information about a constraint on the system from the memory, the retrieved constraint relating to booting of the first virtual machine or first physical machine;

determining whether the collected configuration parameters satisfy the retrieved constraint;

controlling discontinuation of the booting of the first virtual machine or the first physical machine, depending on a result of the determining;

selecting a second virtual machine other than the first virtual machine, or a second physical machine other than the first physical machine;

determining whether the constraint is satisfied under an assumption that the second virtual machine or second physical machine is configured and booted with the configuration parameters of the first virtual machine or first physical machine; and booting up the second virtual machine or second physical machine, when the constraint is satisfied under the assumption.

* * * * *